(12) United States Patent
Funatsu

(10) Patent No.: US 12,684,225 B2
(45) Date of Patent: \*Jul. 14, 2026

(54) ELECTRONIC APPARATUS, METHOD FOR CONTROLLING ELECTRONIC APPARATUS, AND STORAGE MEDIUM

(71) Applicant: CANON KABUSHIKI KAISHA, Tokyo (JP)

(72) Inventor: Yoshihiro Funatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

This patent is subject to a terminal disclaimer.

(21) Appl. No.: 18/180,426

(22) Filed: Mar. 8, 2023

(65) Prior Publication Data

US 2023/0291995 A1 Sep. 14, 2023

(30) Foreign Application Priority Data

Mar. 14, 2022 (JP) ................................. 2022-039130

(51) Int. Cl.
*H04N 23/61* (2023.01)
*H04N 23/62* (2023.01)
*H04N 23/695* (2023.01)

(52) U.S. Cl.
CPC ............. *H04N 23/62* (2023.01); *H04N 23/61* (2023.01); *H04N 23/695* (2023.01)

(58) Field of Classification Search
CPC .. H04N 23/632; H04N 23/631; H04N 23/695; H04N 23/61; H04N 23/62; H04N 23/675; H04N 23/635
See application file for complete search history.

(56) References Cited

U.S. PATENT DOCUMENTS

| | | | | |
|---|---|---|---|---|
| 12,315,205 | B2* | 5/2025 | Deshpande | ............. G06T 9/002 |
| 2019/0191101 | A1* | 6/2019 | Ogawa | ................. H04N 23/634 |
| 2020/0393898 | A1* | 12/2020 | Ichikawa | .............. G06F 3/0488 |
| 2021/0360146 | A1* | 11/2021 | Kimishima | ............ H04N 23/73 |
| 2022/0191561 | A1* | 6/2022 | Hinds | .............. H04N 21/85406 |
| 2022/0337853 | A1* | 10/2022 | Li | ............................ H04N 19/31 |
| 2022/0337857 | A1* | 10/2022 | Choi | ....................... H04N 19/46 |
| 2022/0400207 | A1* | 12/2022 | Funatsu | ................. H04N 23/62 |
| 2023/0007067 | A1* | 1/2023 | Hinds | ................. H04L 65/1096 |
| 2024/0064402 | A1* | 2/2024 | Sato | ..................... H04N 23/631 |
| 2024/0114170 | A1* | 4/2024 | Maharana | .............. G06T 7/246 |

FOREIGN PATENT DOCUMENTS

| | | |
|---|---|---|
| JP | 2009171233 A | 7/2009 |
| JP | 2010141820 A | 6/2010 |
| JP | 2010230870 A | 10/2010 |
| JP | 2019016906 A | 1/2019 |
| WO | 2020121654 A1 | 6/2020 |

* cited by examiner

*Primary Examiner* — Tsion B Owens
(74) *Attorney, Agent, or Firm* — Canon U.S.A., Inc. IP Division

(57) ABSTRACT

An electronic apparatus includes a step of controlling first processing for setting a tracking start position at a tracking position immediately before and second processing for setting the tracking start position at a predetermined tracking start position. The electronic apparatus switches and performs the first processing and the second processing depending on a state when the tracking is stopped.

18 Claims, 17 Drawing Sheets

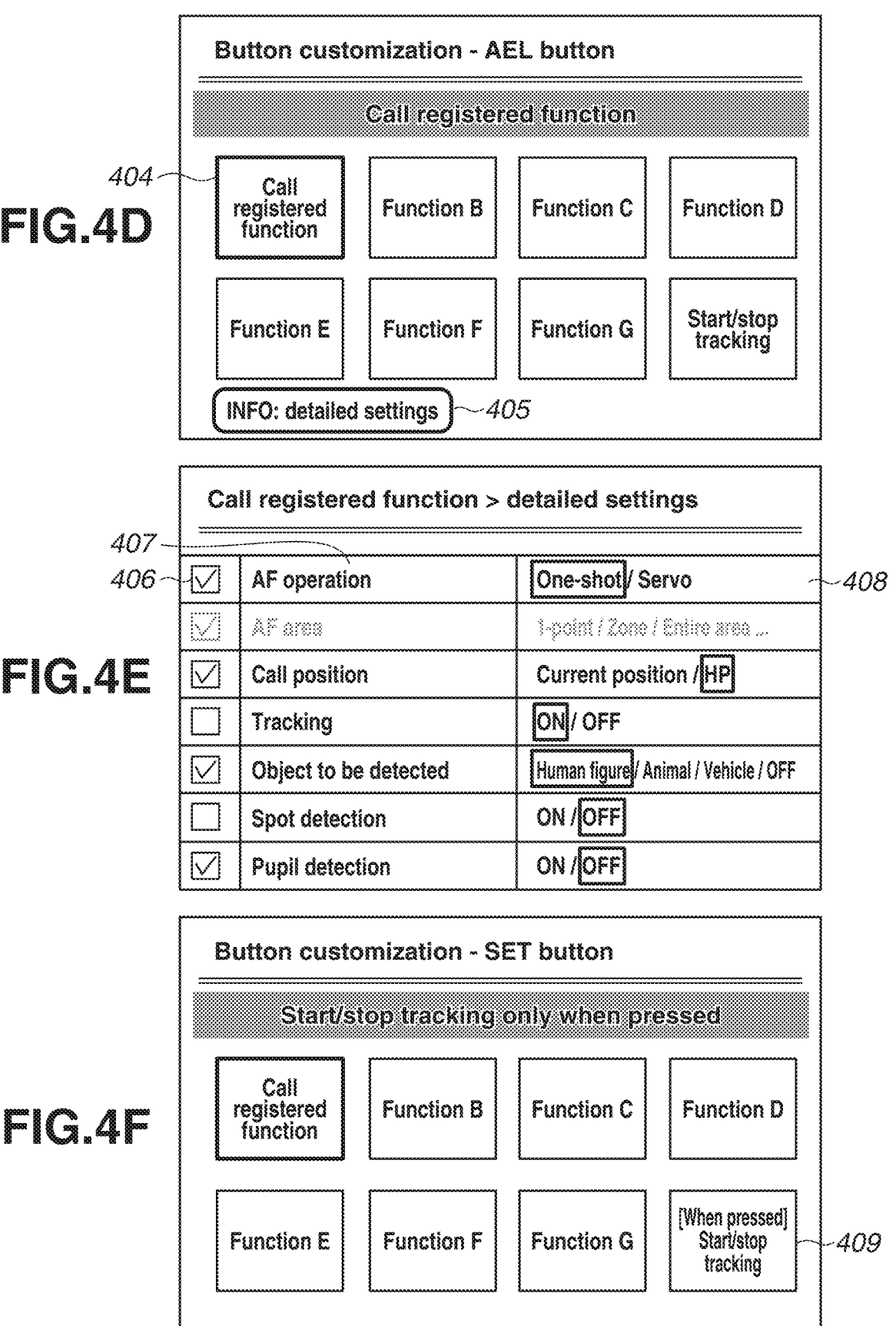

FIG.4D

Button customization - AEL button

Call registered function

404 — Call registered function | Function B | Function C | Function D

Function E | Function F | Function G | Start/stop tracking

INFO: detailed settings ~405

FIG.4E

Call registered function > detailed settings

| | | |
|---|---|---|
| ☑ | AF operation | One-shot / Servo ~408 |
| ☑ | AF area | 1-point / Zone / Entire area ... |
| ☑ | Call position | Current position / HP |
| ☐ | Tracking | ON / OFF |
| ☑ | Object to be detected | Human figure / Animal / Vehicle / OFF |
| ☐ | Spot detection | ON / OFF |
| ☑ | Pupil detection | ON / OFF |

Button customization - SET button

Start/stop tracking only when pressed

Call registered function | Function B | Function C | Function D

Function E | Function F | Function G | [When pressed] Start/stop tracking ~409

| | | SPOT | 1-POINT | 1-POINT M | 1-POINT L | ZONE 1 | ZONE 2 | ZONE 3 | ENTIRE AREA |
|---|---|---|---|---|---|---|---|---|---|
| | | | | | AF AREA | | | | |
| TRACKING SETTING | OFF | | | | | | | | |
| | ON | | | | | | | | |

506

| | | |
|---|---|---|
| AF OPERATION | ONE-SHOT | SERVO |
| | ONE SHOT | SERVO |

507

| | | | | |
|---|---|---|---|---|
| OBJECT TO BE DETECTED | HUMAN FIGURE | ANIMAL | VEHICLE | OFF |
| | | | | OFF |

508

| | | |
|---|---|---|
| PUPIL DETECTION | ON | OFF |
| | ON | OFF |

509

| | | |
|---|---|---|
| TRACKING STATE | ON | OFF |
| | ON | OFF |

| | | SPOT/1-POINT/POINT EXPANSION | ZONE | ENTIRE AREA |
|---|---|---|---|---|
| | | AF AREA | | |
| TRACKING OFF | AF AREA FRAME IS ACTIVE | 7-A | 7-B | 7-C |
| | DETECTION FRAME IS ACTIVE | 7-D | 7-E | 7-F |
| | TRACKING FRAME IS ACTIVE | 7-G | 7-H | 7-I |
| TRACKING ON | AF AREA FRAME IS ACTIVE | 7-J | 7-K | 7-L |
| | DETECTION FRAME IS ACTIVE | 7-M | 7-N | 7-O |
| | TRACKING FRAME IS ACTIVE | 7-P | 7-Q | 7-R |

FIG.10A

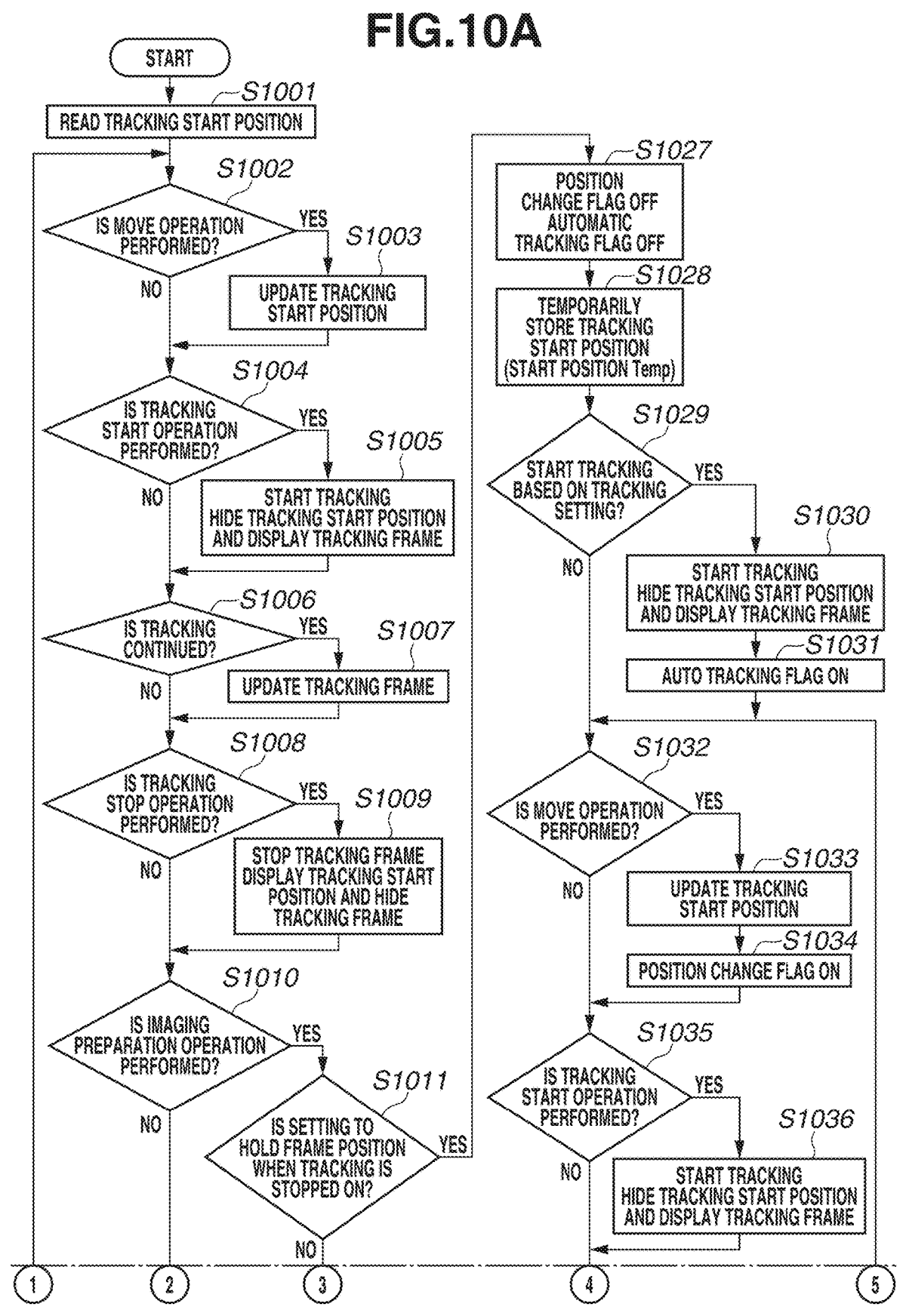

START

*S1001*
READ TRACKING START POSITION

*S1002*
IS MOVE OPERATION PERFORMED? —YES→ *S1003* UPDATE TRACKING START POSITION

NO

*S1004*
IS TRACKING START OPERATION PERFORMED? —YES→ *S1005* START TRACKING HIDE TRACKING START POSITION AND DISPLAY TRACKING FRAME

NO

*S1006*
IS TRACKING CONTINUED? —YES→ *S1007* UPDATE TRACKING FRAME

NO

*S1008*
IS TRACKING STOP OPERATION PERFORMED? —YES→ *S1009* STOP TRACKING FRAME DISPLAY TRACKING START POSITION AND HIDE TRACKING FRAME

NO

*S1010*
IS IMAGING PREPARATION OPERATION PERFORMED? —YES→ *S1011* IS SETTING TO HOLD FRAME POSITION WHEN TRACKING IS STOPPED ON? —YES→

NO                                        NO

*S1027*
POSITION CHANGE FLAG OFF AUTOMATIC TRACKING FLAG OFF

*S1028*
TEMPORARILY STORE TRACKING START POSITION (START POSITION Temp)

*S1029*
START TRACKING BASED ON TRACKING SETTING? —YES→ *S1030* START TRACKING HIDE TRACKING START POSITION AND DISPLAY TRACKING FRAME

NO

*S1031*
AUTO TRACKING FLAG ON

*S1032*
IS MOVE OPERATION PERFORMED? —YES→ *S1033* UPDATE TRACKING START POSITION

NO                                        *S1034* POSITION CHANGE FLAG ON

*S1035*
IS TRACKING START OPERATION PERFORMED? —YES→ *S1036* START TRACKING HIDE TRACKING START POSITION AND DISPLAY TRACKING FRAME

NO

① ② ③ ④ ⑤

ELECTRONIC APPARATUS, METHOD FOR CONTROLLING ELECTRONIC APPARATUS, AND STORAGE MEDIUM

BACKGROUND OF THE DISCLOSURE

Field of the Disclosure

The present disclosure relates to an electronic apparatus, a method for controlling an electronic apparatus, and a storage medium.

Description of the Related Art

There have recently been digital cameras and other electronic apparatuses having a function of automatically detecting an object to be tracked and performing tracking. Such apparatuses present a tracking state to the user by updating an index (e.g., frame display) indicating the position and size of the object displayed on a display screen as appropriate.

In particular, some imaging apparatuses, such as a digital camera, equipped with a focus lens have a function of tracking an object and continuing to focus on the object by causing an automatic focus (AF) area (AF frame) to automatically track the object while performing focus control.

Aside from the function of automatically detecting an object and performing tracking, a function of tracking an object near a set position by the user setting a position to start tracking in advance and performing a tracking start operation. The tracking can thus be started at timing desired by the user.

Japanese Patent Application Laid-Open No. 2010-141820 discusses fixing an AF frame at the center of a captured image when AF frame automatic tracking is not performed. If the user wants to perform the AF frame automatic tracking with a predetermined object as a tracking object, the user operates the imaging angle of view of the camera so that the object is included within the AF frame at the center, and issues an instruction to start tracking. The AF frame automatic tracking is thereby started with the object as the tracking object. If the user issues an instruction to stop tracking, the AF frame is reset to and fixed at the center of the imaging range, and the AF frame automatic tracking processing is stopped.

By the method discussed in Japanese Patent Application Laid-Open No. 2010-141820, however, the tracking start position is reset to the original AF position at the center when the user issues an instruction to stop tracking. The user can thus miss a photo opportunity due to the discontinuity of tracking.

SUMMARY OF THE DISCLOSURE

The present disclosure is directed to enabling setting of an optimum tracking start position.

According to an aspect of the present disclosure, a method for controlling an electronic apparatus includes tracking a tracking object in an image, moving a tracking start position, starting tracking of the tracking object at the tracking start position, temporarily stopping the tracking of the tracking object based on a user operation, and controlling first processing for setting the tracking start position at a tracking position immediately before and second processing for setting the tracking start position at a predetermined tracking start position. The first processing and the second processing are switched and performed depending on a state when the tracking is stopped.

Further features of the present disclosure will become apparent from the following description of exemplary embodiments with reference to the attached drawings.

BRIEF DESCRIPTION OF THE DRAWINGS

FIGS. 4A to 4F are diagrams related to a menu for setting customized button functions for activating tracking and calling functions.

FIG. 6 is a diagram illustrating frame display before and after automatic focus (AF) activation (operation).

FIG. 7 is a diagram illustrating frame display depending on the combinations of an AF area and a tracking setting.

FIGS. 10A to 10C illustrate a flowchart of control in the case of servo AF.

DESCRIPTION OF THE EMBODIMENTS

Exemplary embodiments of the present disclosure will be described in detail below with reference to the attached drawings.

Configuration of Digital Camera

Figure 1A:
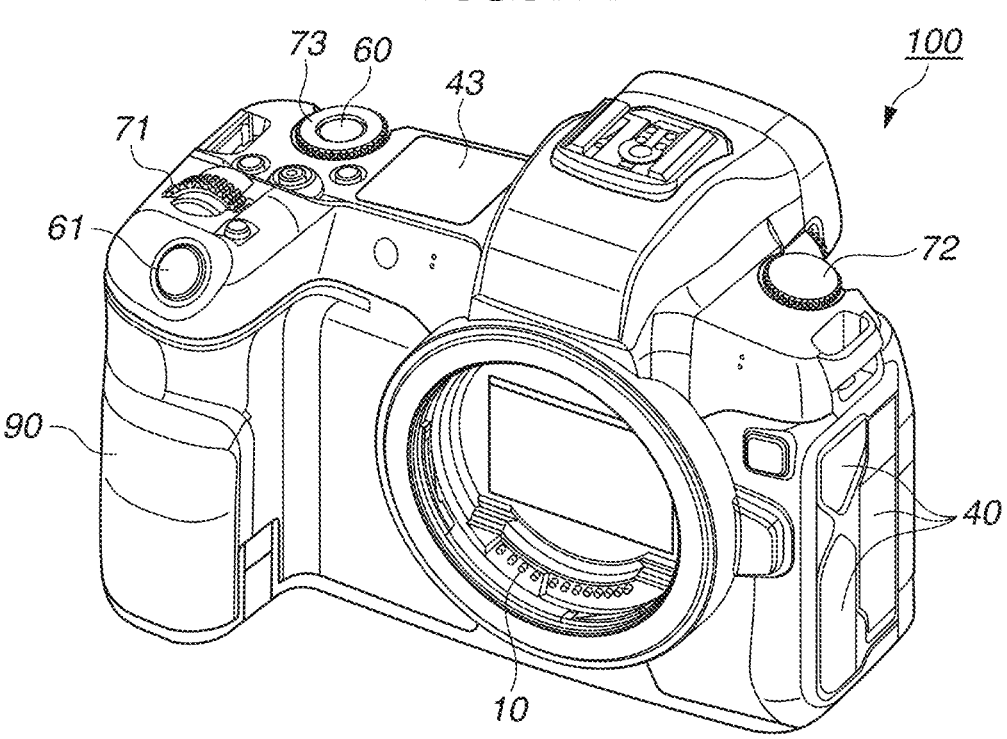
FIGS. 1A and 1B are external views of a digital camera.
Figure 1B:
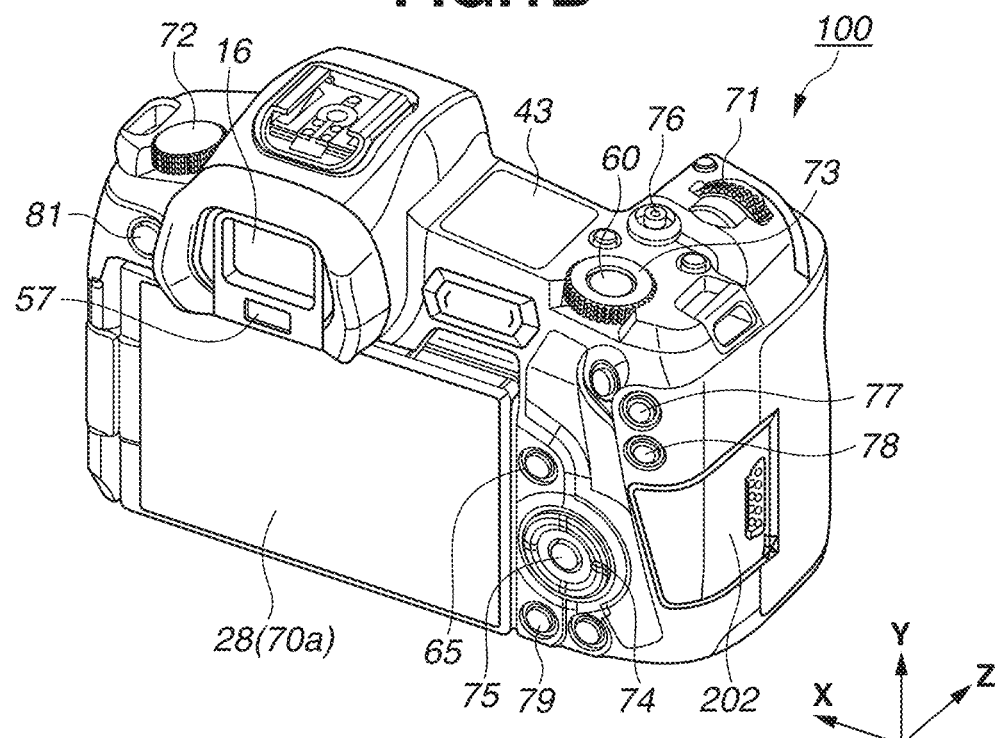

FIGS. 1A and 1B illustrate external views of a digital camera 100 that is an example of an apparatus (electronic apparatus) to which an exemplary embodiment of the present disclosure can be applied. FIG. 1A is a perspective front view of the digital camera 100. FIG. 1B is a perspective rear view of the digital camera 100. In FIGS. 1A and 1B, a display unit 28 is a display unit disposed on the back of the digital camera 100. The display unit 28 displays images and various types of information. A touchscreen 70a can detect a touch operation on the display surface (operation surface) of the display unit 28. An extra-viewfinder display unit 43 is a display unit disposed on the top surface of the digital camera 100. The extra-viewfinder display unit 43 displays various setting values of the digital camera 100, including a shutter speed and an aperture value. A shutter button 61 is an operation unit for issuing imaging instructions. A mode change switch 60 is an operation unit for switching various modes. A terminal cover 40 is a cover that protects connectors (not illustrated) for connecting connection cables from external devices and the digital camera 100.

A main electronic dial 71 is a rotary operation member. Setting values, such as the shutter speed and the aperture value, can be changed by rotating the main electronic dial 71. A power switch 72 is an operation member for powering the digital camera 100 on and off. A sub electronic dial 73 is a rotary operation member, and can move a selection frame or scroll through images. A directional keypad 74 is a directional operation member (four-way keypad) including a push button that can be pressed in four directions, or in top, bottom, left, and right portions. Operations can be performed depending on the pressed portion of the directional keypad 74 in the pressed direction. A set button 75 is a push button and mainly used to determine a selection item. A moving image button 76 is used to issue instructions to start or stop capturing (recording) a moving image.

An automatic exposure (AE) lock button 77 can lock an exposure state when pressed in an imaging standby state. A magnify button 78 is an operation button for turning on and off a magnification mode during a live-view display in an imaging mode. A live-view (LV) image can be magnified or reduced by operating the main electronic dial 71 with the magnification mode on. In a playback mode, the magnify button 78 functions as a magnify button for magnifying a playback image and increasing the magnification ratio. A playback button 79 is an operation button for switching between the imaging mode and the playback mode. If the playback button 79 is pressed during the imaging mode, the imaging mode transitions to the playback mode and the latest image among images recorded on a recording medium 200 can be displayed on the display unit 28. If a menu button 81 is pressed, a menu screen capable of making various settings is displayed on the display unit 28. The user can intuitively make various settings by using the menu screen displayed on the display unit 28, the directional keypad 74, the set button 75, and/or a multi-controller (MC) 65. The MC 65 can accept directional instructions in eight directions and a push operation in the center.

A communication terminals 10 are communication terminals for the digital camera 100 to communicate with a lens unit 150 (attachable and detachable) to be described below. An eyepiece unit 16 is an eyepiece unit of an eyepiece viewfinder (look-through viewfinder). Through the eyepiece unit 16, the user can view a video image displayed on an electronic viewfinder (EVF) 29 inside. An eye access detection unit 57 is an eye access detection sensor for detecting whether the user is making an eye access to the eyepiece unit 16. A lid 202 is a lid for a slot accommodating the recording medium 200.

A grip portion 90 is a holding portion having a shape that the user holding the digital camera 100 can easily grip with the right hand. The shutter button 61 and the main electronic dial 71 are located at positions operable by the index finger of the right hand in a state where the user holds the digital camera 100 with the grip portion 90 gripped by the little finger, ring finger, and middle finger of the right hand. The sub electronic dial 73 is located at a position operable by the right thumb in the same state.

Figure 2:
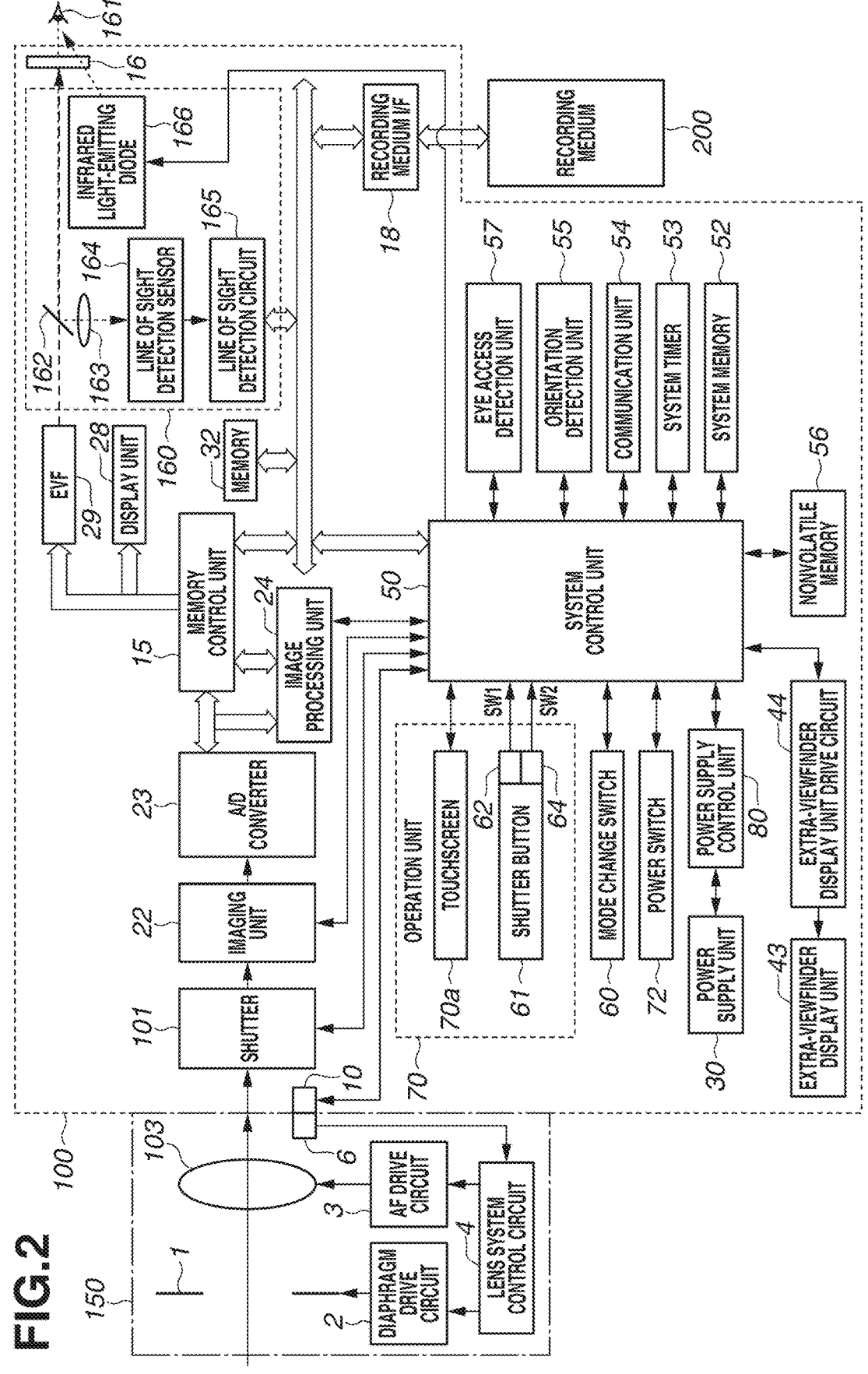
FIG. 2 is a block diagram illustrating a configuration example of the digital camera.

FIG. 2 is a block diagram illustrating a configuration example of the digital camera 100 according to the present exemplary embodiment. In FIG. 2, a lens unit 150 is a lens unit including an interchangeable imaging lens. A lens 103 is typically composed of a plurality of lenses but illustrated as a single lens for the sake of simplification. A communication terminal 6 is a communication terminal for the lens unit 150 to communicate with the digital camera 100. The lens unit 150 communicates with a system control unit 50 via the communication terminal 6 and the foregoing communication terminals 10, and controls a diaphragm 1 via a diaphragm drive circuit 2 using a lens system control circuit 4 inside. The lens unit 150 then adjusts focus by moving the lens 103 via an automatic focus (AF) drive circuit 3.

A shutter 101 is a focal plane shutter that can freely control the exposure time of an imaging unit 22 under control of the system control unit 50.

The imaging unit 22 is an image sensor including a charge-coupled device (CCD) or complementary metal-oxide-semiconductor (CMOS) element for converting an optical image into an electrical signal. An analog-to-digital (A/D) converter 23 converts an analog signal output from the imaging unit 22 into a digital signal.

An image processing unit 24 performs predetermined resize processing, such as pixel interpolation or reduction, and color conversion processing on data from the A/D converter 23 or data from a memory control unit 15 to be described below.

The image processing unit 24 also performs predetermined calculation processing using captured image data. The system control unit 50 performs exposure control and focus adjustment control based on calculation results obtained by the image processing unit 24. Through-the-lens (TTL) AF processing, AE processing, and electronic flash (EF) (preliminary flash emission) processing are thereby performed. The image processing unit 24 further performs predetermined calculation processing using the captured image data, and performs TTL automatic white balance (AWB) processing based on the obtained calculation results.

The memory control unit 15 controls data transmission and reception between the A/D converter 23, the image processing unit 24, and a memory 32. Output data from the A/D converter 23 is written to the memory 32 via the image processing unit 24 and the memory control unit 15, or directly via the memory control unit 15.

The memory 32 stores image data obtained by the imaging unit 22 and digitally converted by the A/D converter 23. The memory 32 has a sufficient storage capacity to store a predetermined number of still images or a predetermined duration of moving image and sound. The memory 32 also serves as an image display memory (video memory). Image data written in the memory 32 is displayed on the display unit 28 and the EVF 29 via the memory control unit 15. The display unit 28 and the EVF 29 provide display based on the signal from the memory control unit 15 on a display device, such as a liquid crystal display (LCD) and an organic electroluminescence (EL) display. An LV display can be provided by successively transferring data A/D-converted by the A/D converter 23 and accumulated in the memory 32 to the display unit 28 or the EVF 29. The image displayed in a live view will hereinafter be referred to as an LV image.

An infrared light-emitting diode 166 is a light-emitting element for detecting the user's line of sight position within the viewfinder screen. The infrared light-emitting diode 166 irradiates the user's eyeball (eye) 161 accessing the eyepiece unit 16 with infrared rays. The infrared rays emitted from the infrared light-emitting diode 166 are reflected by the eyeball (eye) 161, and the reflected infrared rays reach a dichroic mirror 162. The dichroic mirror 162 reflects only infrared rays and transmits visible light. The reflected infrared rays changed in the optical path form an image on an imaging surface of a line of sight detection sensor 164 via a focusing lens 163. The focusing lens 163 is an optical member constituting a line of sight detection optical system. The line of sight detection sensor 164 includes an imaging device such as a CCD image sensor.

The line of sight detection sensor 164 photoelectrically convers the incident reflected infrared rays into an electrical signal, and outputs the electrical signal to a line of sight detection circuit 165. The line of sight detection circuit 165 includes at least one processor. The line of sight detection circuit 165 detects the user's line of sight position from an image or movement of the user's eyeball (eye) 161 based on the output signal of the line of sight detection sensor 164, and outputs the detected information to the system control unit 50. The dichroic mirror 162, the focusing lens 163, the line of sight detection sensor 164, the infrared light-emitting diode 166, and the line of sight detection circuit 165 thus constitute a line of sight detection block 160.

In the present exemplary embodiment, the line of sight is detected by a method called corneal reflection, using the line of sight detection block 160. The corneal reflection method detects the direction and position of the line of sight from a positional relationship between the infrared rays emitted from the infrared light-emitting diode 166 and reflected by the eyeball (eye) 161, or the cornea in particular, and the pupil of the eyeball (eye) 161. There are various other methods for detecting the direction and position of the line of sight, such as a method called scleral reflection using a difference in light reflectance between the iris and white part of the eye. As long as the direction and position of the line of sight can be detected, any line of sight detection method other than the foregoing can be used.

The extra-viewfinder display unit 43 displays various setting values of the digital camera 100, including the shutter speed and the aperture value, via an extra-viewfinder display unit drive circuit 44.

A nonvolatile memory 56 is an electrically erasable and recordable memory. For example, a flash read-only memory (ROM) is used as the nonvolatile memory 56. The nonvolatile memory 56 stores operating constants of the system control unit 50 and programs. The programs here refer to computer programs for performing various flowcharts to be described below in the present exemplary embodiment.

The system control unit 50 is a control unit including at least one processor or circuit, and controls the entirety of the digital camera 100. The system control unit 50 implements various processes according to the present exemplary embodiment to be described below by executing the foregoing programs recorded in the nonvolatile memory 56. A random access memory (RAM) is used as the system memory 52, for example. The operating constants and variables of the system control unit 50 and the programs read from the nonvolatile memory 56 are loaded into the system memory 52. The system control unit 50 also performs display control by controlling the memory 32 and the display unit 28.

A system timer 53 is a clocking unit that measures time used in various types of control and the time of a built-in clock.

Various operation members serving as input units for accepting operations from the user include at least the following: the shutter button 61, the MC 65, the touchscreen 70a, the main electronic dial 71, the sub electronic dial 73, the directional keypad 74, the set button 75, the moving image button 76, the AE lock button 77, the magnify button 78, the playback button 79, and the menu button 81, which are included in the operation unit 70. The mode change switch 60 and the power switch 72 are also included in the operation members for accepting operations from the user.

The operation unit 70, the mode change switch 60, and the power switch 72 function as operations units for inputting various operation instructions into the system control unit 50.

The mode change switch 60 switches the operation mode of the system control unit 50 to either a still image capturing mode or a moving image capturing mode. Still image capturing modes includes an automatic imaging mode, an automatic scene determination mode, a manual mode, an aperture priority mode (aperture value [Av] mode), a shutter speed priority mode (time value [Tv] mode), and a program AE mode (program [P] mode). Various scene modes for implementing scene-specific imaging settings and a custom mode are also included. The user can directly switch to one of these modes using the mode change switch 60. Alternatively, the user can switch to an imaging mode list screen once using the mode change switch 60, and then select one of the modes displayed and switch to the selected mode using another operation member. The moving image capturing mode can similarly include a plurality of modes.

The shutter button 61 is configured as a two-stage switch including a first shutter switch 62 and a second shutter switch 64.

The first shutter switch 62 turns on to generate a first shutter switch signal SW1 when the shutter button 61 on the digital camera 100 is operated halfway, i.e., half-pressed (imaging preparation instruction). The system control unit 50 starts imaging preparation operations, such as the AF processing, the AE processing, the AWB processing, and the EF (preliminary flash emission) processing, in response to the first shutter switch signal SW1.

The second shutter switch 64 turns on to generate a second shutter switch signal SW2 when the shutter button 61 is fully operated, i.e., fully pressed (imaging instruction). The system control unit 50 starts a series of imaging processing operations from signal reading from the imaging unit 22 to the writing of a captured image to the recording medium 200 as an image file, in response to the second shutter switch signal SW2.

A power supply control unit 80 includes a battery detection circuit, a direct-current-to-direct-current (DC-DC) converter, and a switch circuit for switching blocks to be energized, and detects the presence or absence of a battery attached, the type of battery, and the remaining battery level. The power supply control unit 80 also controls the DC-DC converter based on the detection results and instructions from the system control unit 50, and supplies predetermined voltages to various components including the recording medium 200 for predetermined periods. A power supply unit 30 includes a primary battery such as an alkali battery and a lithium battery, a secondary battery such as a nickel-cadmium (NiCd) battery, a nickel metal halide (NiMH) battery, and a lithium ion (Li) battery, and/or an alternating current (AC) adaptor.

A recording medium I/F 18 is an I/F with the recording medium 200, such as a memory card and a hard disk. The recording medium 200 is a recording medium for recording captured images, and includes, for example, a semiconductor memory or a magnetic disk.

A communication unit 54 connects wirelessly or using a cable, and transmits and receives a video signal and an audio signal. The communication unit 54 can connect to a wireless local area network (LAN) and the Internet. The communication unit 54 can also communicate with external devices by using Bluetooth® or Bluetooth® Low Energy. The communication unit 54 can transmit images captured by the imaging unit 22 (including an LV image) and images recorded on the recording medium 200, and can receive images and various other types of information from external devices.

An orientation detection unit 55 detects the orientation of the digital camera 100 with respect to the direction of gravity. Based on the orientation detected by the orientation detection unit 55, it can be determined whether an image captured by the imaging unit 22 is one captured with the digital camera 100 held landscape or one captured with the digital camera 100 held portrait. The system control unit 50 can attach orientation information based on the orientation detected by the orientation detection unit 55 to the image file of the image captured by the imaging unit 22, or rotate the image and record the rotated image. An acceleration sensor or a gyro sensor can be used as the orientation detection unit 55. The movement (e.g., pan, tilt, lift, and whether at rest or not) of the digital camera 100 can also be detected using the acceleration sensor or gyro sensor serving as the orientation detection unit 55.

The eye access detection unit 57 is an eye access detection sensor for detecting approach (eye access) and separation (eye separation) of the eye (object) 161 to/from the eyepiece unit 16 of the viewfinder (approach detection). The system control unit 50 switches display (display state) and non-display (non-display state) of the display unit 28 and the EVF 29 depending on the state detected by the eye access detection unit 57. More specifically, suppose that the digital camera 100 is at least in the imaging standby state and a display destination switch setting of the LV image captured by the imaging unit 22 is an automatic switch setting. In such a case, the system control unit 50 turns display on with the display unit 28 as the display destination and hides the EVF 29 during non-eye access. The system control unit 50 turns display on with the EVF 29 as the display destination and hides the display unit 28 during eye access. An infrared proximity sensor can be used as the eye access detection unit 57, for example. The eye access detection unit 57 can detect approach of an object to the eyepiece unit 16 of the viewfinder having the built-in EVF 29. If an object approaches, infrared rays projected from a light projection part (not illustrated) of the eye access detection unit 57 are reflected from the object and received by a light reception part (not illustrated) of the infrared proximity sensor. The distance of the approaching object to the eyepiece unit 16 (eye access distance) can also be determined based on the amount of infrared rays received. The eye access detection unit 57 thus performs eye access detection to detect the proximity distance of the object to the eyepiece unit 16. In the present exemplary embodiment, suppose that the light projection part and the light reception part of the eye access detection unit 57 are devices separate from the infrared light-emitting diode 166 and the line of sight detection sensor 164 described above. However, the infrared light-emitting diode 166 can serve as the light projection part of the eye access detection unit 57. The line of sight detection sensor 164 can also serve as the light reception part.

When an object approaching from a non-eye access state (non-approaching state) to within a predetermined distance from the eyepiece unit 16 is detected, eye access is detected. When the object of which the approach is detected in an eye access state (approaching state) gets separated a predetermined distance or more, eye separation is detected. The threshold for detecting eye access and the threshold for detecting eye separation may be different from each other. For example, the thresholds can have a hysteresis. After the detection of eye access, the eye access state lasts until eye separation is detected.

After the detection of eye separation, the non-eye access state lasts until eye access is detected. Note that the infrared proximity sensor is just an example, and any other sensor capable of detecting the approach of an eye or object that can be considered to be eye access can be used as the eye access detection unit 57.

Based on the output from the line of sight detection block 160, the system control unit 50 can detect the following operations or states:

That the line of sight of the user making eye access to the eyepiece unit 16 is newly input (detected). That is, a start of a line of sight input.

A state where there is a line of sight input of the user making eye access to the eyepiece unit 16.

A state where the user making eye access to the eyepiece unit 16 is gazing.

That the user making eye access to the eyepiece unit 16 looks away. That is, an end of the light of sight input.

A state where the user making eye access to the eyepiece unit 16 is not making any line of sight input.

As employed herein, gazing refers to a case where the amount of movement of the user's line of sight position does not exceed a predetermined amount of movement within a predetermined time.

The touchscreen 70*a* and the display unit 28 can be integrally configured. For example, the touchscreen 70*a* is configured such that the light transmittance thereof does not interfere with the display of the display unit 28, and attached onto the display screen of the display unit 28. The input coordinates of the touchscreen 70*a* and the display coordinates on the display surface of the display unit 28 are then associated with each other. This can provide a graphical user interface (GUI) as if the user can directly operate the screen displayed on the display unit 28. The system control unit 50 can detect the following operations or states of the touchscreen 70*a*:

That a finger or pen that has not being touching the touchscreen 70*a* makes a new touch on the touchscreen 70*a*. That is, a start of a touch (hereinafter, referred to as a touch-down).

A state where a finger or pen is touching the touchscreen 70*a* (hereinafter, referred to as a touch-on).

That a finger or pen touching the touchscreen 70*a* is moving (hereinafter, referred to as a touch-move).

That a finger or pen that has being touching the touchscreen 70*a* is released. That is, an end of a touch (hereinafter, referred to as a touch-up).

A state where nothing is touching the touchscreen 70*a* (hereinafter, referred to as a touch-off).

If a touch-down is detected, a touch-on is detected at the same time. After a touch-down, a touch-on usually continues to be detected unless a touch-up is detected. A touch-move is detected in a state where a touch-on is detected. If a touch-on is detected and the touch position does not move, a touch-move is not detected. After a touch-up of all fingers and pens touching is detected, a touch-off is detected.

The system control unit 50 is notified of such operations and states and the position coordinates of the touching fingers and pens on the touch screen 70*a*, via an internal bus. The system control unit 50 determines what operation (touch operation) is performed on the touchscreen 70*a* based on the notified information. In the case of a touch-move, the vertical and horizontal components of the moving direction of a finger or pen moving on the touchscreen 70*a* can be separately determined based on a change in the position coordinates. If a touch move is detected for a predetermined distance or more, a slide operation is determined to be performed. An operation of quickly moving a finger touching the touchscreen 70*a* for some distance and immediately releasing the finger is called flick. In other words, a flick is an operation of quickly moving the finger along the touchscreen 70*a* as if flicking. A flick can be determined to be performed (a flick can be determined to be performed after a slide operation) if a touch-move for a predetermined distance or more at a predetermined speed or more is detected and a touch-up is immediately detected. A touch operation of simultaneously touching a plurality of points (for example, two points) and bringing the touch positions close to each other will be referred to as a pinch-in, and a touch operation of moving the touch positions away from each other as a pinch-out. A pinch-out and a pinch-in are collectively referred to as a pinch operation (or simply a pinch). Any one of touchscreens of various methods including resistive, capacitive, surface acoustic wave, infrared, electromagnetic induction, image recognition, and optical sensor methods can be used as the touchscreen 70a. In some methods, the presence of a touch is detected based on contact with the touchscreen. In some methods, the presence of a touch is detected based on approach of a finger or pen to the touchscreen. Either type of method can be used.

The user can set a method for designating the position of a position index based on a touch-move operation performed in an eye access state, to either absolute positioning or relative positioning. For example, suppose that the position index is an AF frame. In the case of absolute positioning, if the touchscreen 70a is touched, an AF position associated with the touched position (position of which the coordinates are input) is set. In other words, the position coordinates where the touch operation has been performed and the position coordinates on the display unit 28 are associated with each other. By contrast, in the case of relative positioning, the position coordinates where the touch operation has been performed and the position coordinates on the display unit 28 are not associated with each other. In relative positioning, the touch position is moved from the currently set AF position in the direction of movement of the touch-move as much as the distance corresponding to the amount of movement of the touch-move regardless of the touch-down position on the touchscreen 70a.

Setting Screen

FIGS. 3A to 3E are diagrams related to a menu for changing setting values displayed on the display unit 28 or the EVF 29.

Figure 3A:
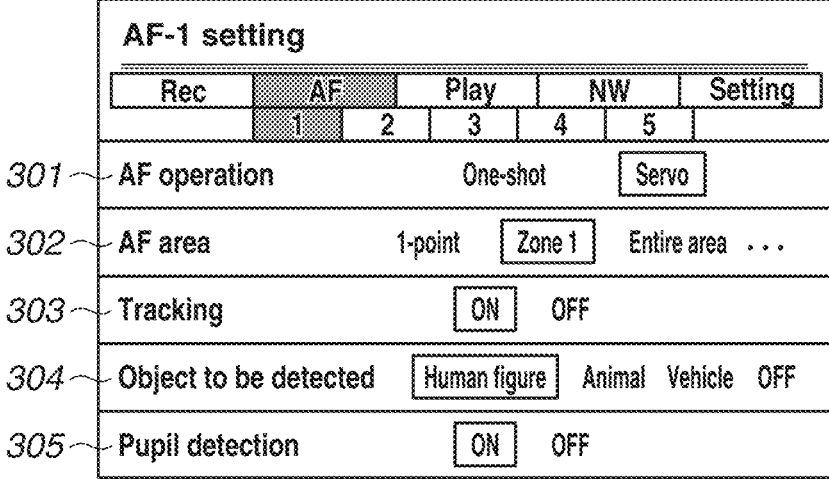
FIGS. 3A to 3E are diagrams related to a menu for changing setting values.

FIG. 3A illustrates a menu setting screen with setting items 301 to 305 and respective setting values.

The setting item 301 is used for AF operation, and it can be set to "one-shot AF" to lock focus after an AF activation (after the imaging preparation instruction) or "servo AF" to perform focus tracking.

The setting item 302 is an AF area setting item, where the size of the area to perform AF can be set.

Figure 3B:
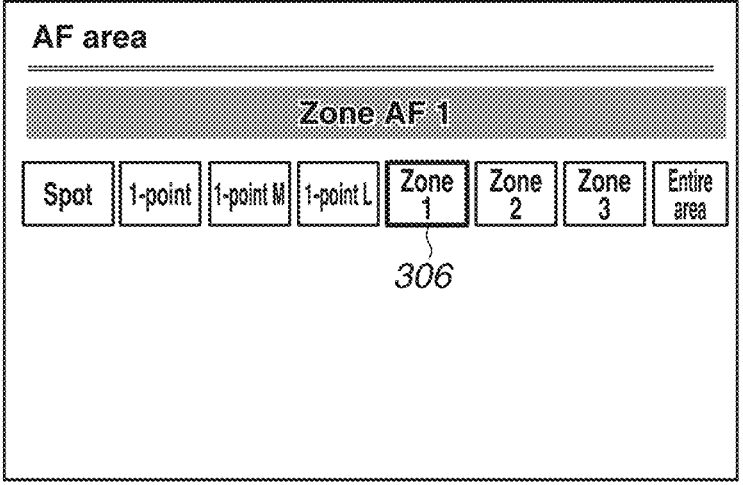

If the setting values are large in number, the setting is made using a dedicated sublevel screen (FIG. 3B). As illustrated in FIG. 3B, the user selects a setting value 306 from a list of setting values.

The setting item 303 is a tracking setting item, where whether to perform tracking after the AF is activated (after the imaging preparation instruction) can be set. An object to be tracked is determined from an AF area before the AF activation (before the imaging preparation instruction), and the size of the AF area is increased to the entire area to track the object over the entire screen after the AF activation (after the imaging preparation instruction). If this setting is on and there is a main object detected, a detection frame is displayed around the main object for user notification. The main object is determined based on the setting of the setting item 304, i.e., the type of object to be detected.

The setting item 304 is a setting item for an object to be detected, where the type of object to give priority to in determining the main object is selected. In the present exemplary embodiment, as illustrated in FIG. 3D, the type can be selected from "human figure" 310, "animal priority", "vehicle priority", and "off". Some setting values can be set in more detail, like a setting item 311. Here, the image processing unit 24 can detect a specific object using captured image data. In the present exemplary embodiment, human figures, animals such as dogs and birds, vehicles, and main areas of such objects are detected (spot-detected) as specific objects. For example, the body, head, pupils, and face can be spot-detected from a human figure. For example, the pupils, face, and body can be spot-detected from an animal. Spot detection can also be set when vehicle priority is selected. For example, the driver of a car, the first car of a train, or the cockpit of an airplane is detected by priority. Machine learning-based training techniques and image processing-based recognition processing are used for such detection methods.

Examples of types of machine learning include the following:

(1) support vector machines, (2) convolutional neural networks, and (3) recurrent neural networks.

An example of the recognition processing in the case of detecting a face is a method for extracting a skin-color area based on pixel tones expressed by image data and detecting a face based on the degrees of matching with face contour templates prepared in advance. Another example is a method for performing face detection by extracting facial feature points, such as the eyes, nose, and mouth, using conventional pattern recognition techniques. The main area detection techniques applicable to the present exemplary embodiment are not limited thereto, and other techniques can be used.

Figure 3C:
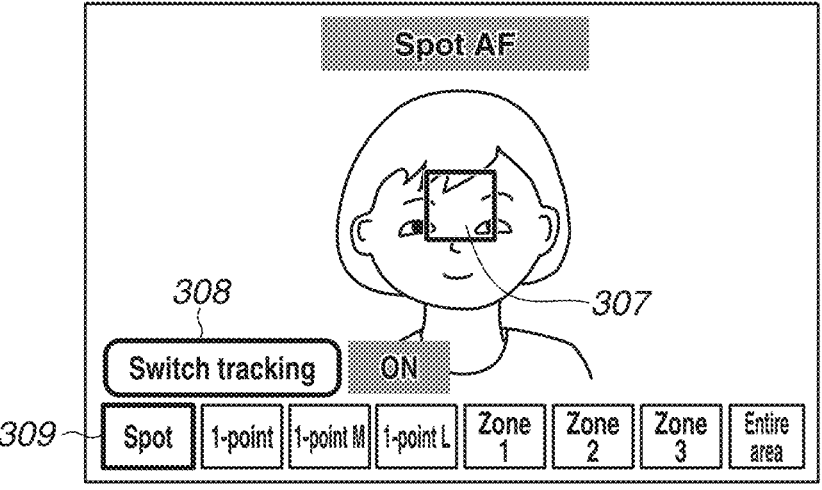
Figure 3D:
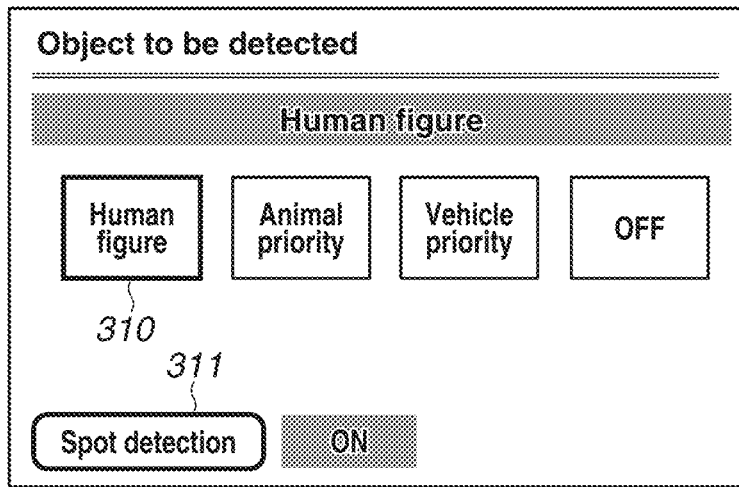
Figure 3E:
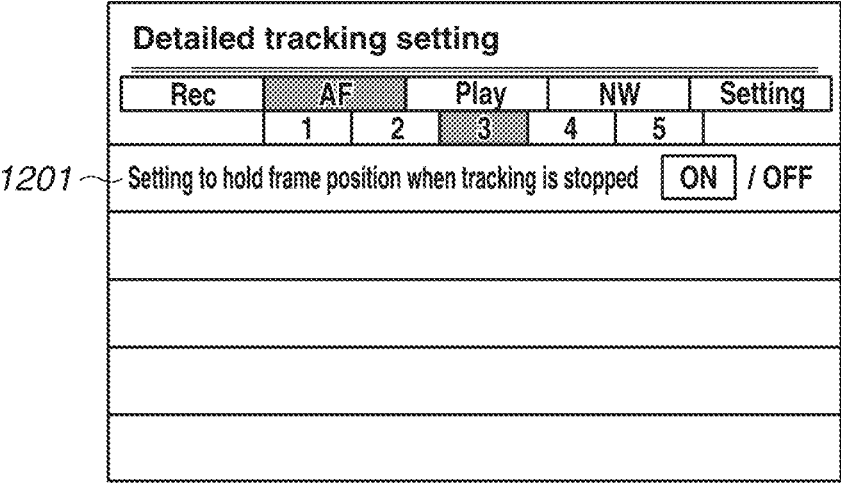

FIG. 3C illustrates a menu screen where an AF area setting 309 and a tracking setting 308 can be simultaneously set. Here, the LV image is displayed on the background, and the user can change the settings while viewing an AF area 307. FIG. 3E illustrates a menu screen for setting whether to hold the frame position when tracking is stopped. A setting item 1201 can set whether to hold the frame position when tracking is stopped. If the setting item 1201 is set to on, the frame position is held when tracking is stopped. If the setting item 1201 is set to off, the frame position is not held when tracking is stopped. The provision of such a user setting enables detailed tracking settings. This menu screen can be hidden on the assumption that the setting item 1201 is fixed to on.

Customized Button Functions

FIGS. 4A to 4F are diagrams illustrating a menu for setting customized button functions for activating tracking and calling functions to be displayed on the display unit 28 or the EVF 29.

Figure 4A:
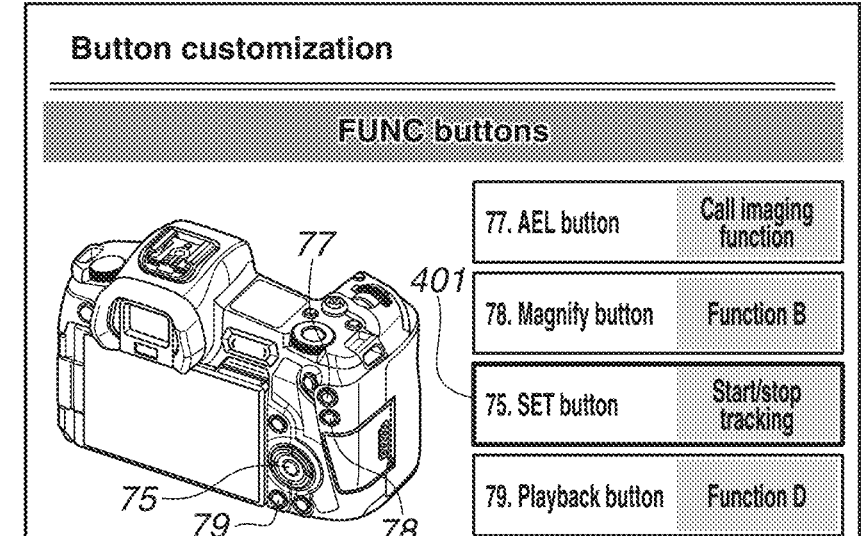
Figure 4B:
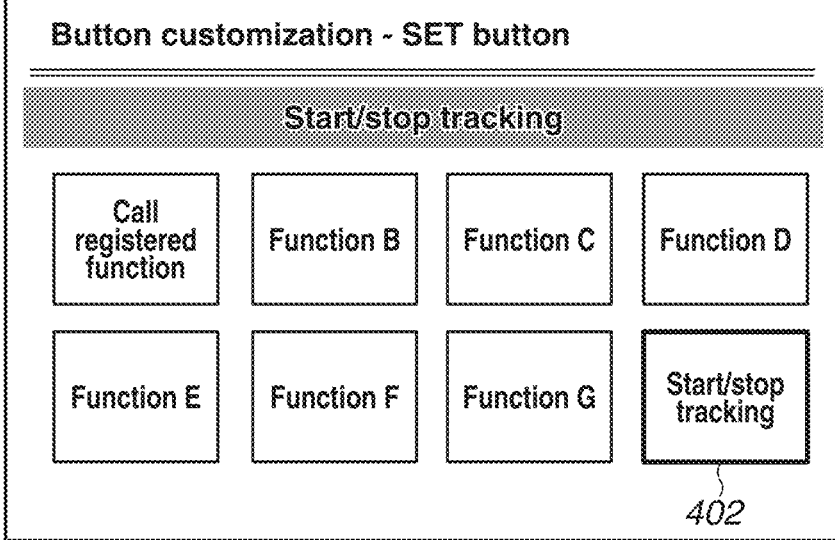

Button customization for activating tracking will be described. For example, as illustrated in FIG. 4A, the user points a cursor (marker) indicating the position of the current processing target to an operation member (for example, button) to be assigned 401 onscreen. In FIG. 4B, functions to be assigned 402 are thereby displayed in a selectable manner. In FIG. 4B, the set button is assigned "start/stop tracking". The function "start/stop tracking" is to start tracking based on the position of the AF area and stop the started tracking regardless of the tracking setting. This function can be activated even during imaging standby (SW0), while AF is on (the first shutter switch 62 is being held, i.e., the first shutter switch signal SW1 is on), or during servo AF (the second shutter switch signal SW2 is on). As illustrated in FIG. 4F, the set button can be assigned a function 409 of temporarily starting or stopping tracking as with "start/stop tracking" only while the assigned custom key (SET button) is pressed by the user.

Figure 4C:
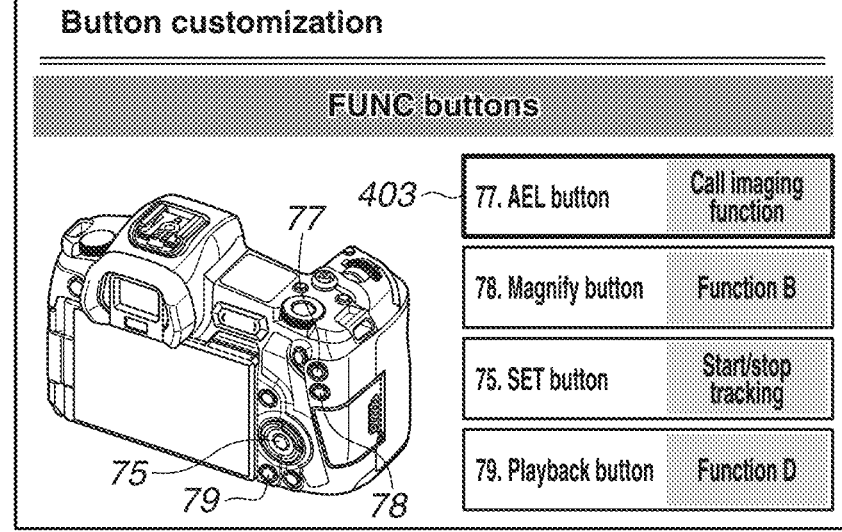

For example, if the user points the cursor to a button to be assigned 403 onscreen as illustrated in FIG. 4C, functions to be assigned 404 are displayed in a selectable manner as illustrated in FIG. 4D. In this diagram, the AE lock (AEL) button 77 is assigned "call registered function".

The function "call registered function" is to call a function registered in advance by the user. If a setting item 405 in FIG. 4D is pressed by the user, a detailed setting screen illustrated in FIG. 4E appears. In FIG. 4E, the user can register a function to be called by selecting a setting item 407 of the function to be called, setting a setting value 408, and checking a checkbox 406. In FIG. 4E, an AF operation "one-shot" and a call position "home position (HP)" are registered. In setting an item, other items can be grayed out to indicate that such items are unable to be registered. For example, in FIG. 4E, the AF area setting item is grayed out to indicate that the AF area is unable to be registered. Setting items not checked by the user, like the tracking setting item and the spot detection setting item in FIG. 4E, will not be changed from the current setting values.

Imaging Information Display and Icons Indicating Setting Values

Figure 5A:
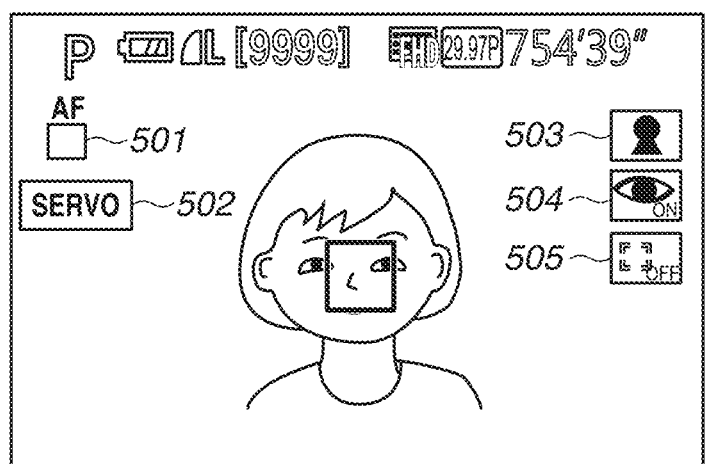
FIGS. 5A and 5B are diagrams illustrating imaging information display and icons indicating setting values.
Figure 5B:
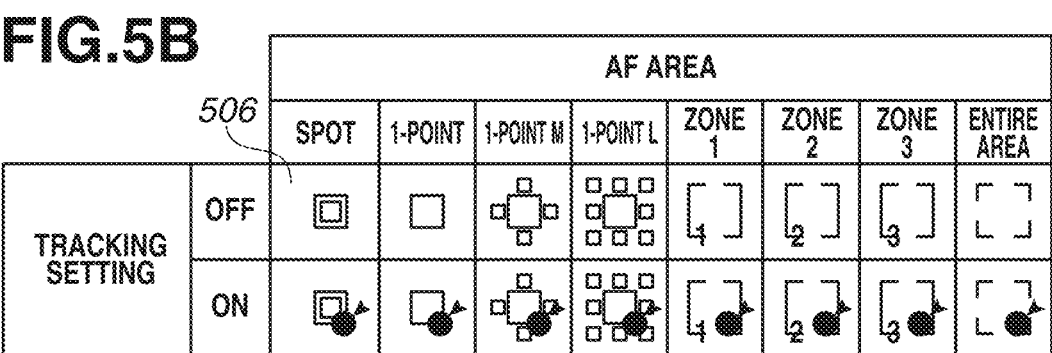

FIGS. 5A and 5B are diagrams for describing imaging information display and icons indicating setting values displayed on the display unit 28 or the EVF 29.

FIG. 5A illustrates an example of a display screen on the display unit 28. An icon 501 indicates an AF area and tracking setting, an icon 502 an AF operation setting, an icon 503 an object to be detected setting, and an icon 504 a pupil detection setting. An icon 505 indicates the state of activation of tracking. The user can find out the current settings and states by observing the icons 501 to 505.

FIG. 5B illustrates examples of lists of icon displays. An icon expressed by a combination of an AF area and a tracking setting, such as an icon 506, is displayed as the icon 501. Icons prepared for respective setting values, such as icons 507, 508, and 509, are displayed as the icons 502, 503, and 504. An icon indicating the state of activation of tracking, such as an icon 510, is displayed as the icon 505.

Frames Displayed Before and After AF Activation

Figure 6:
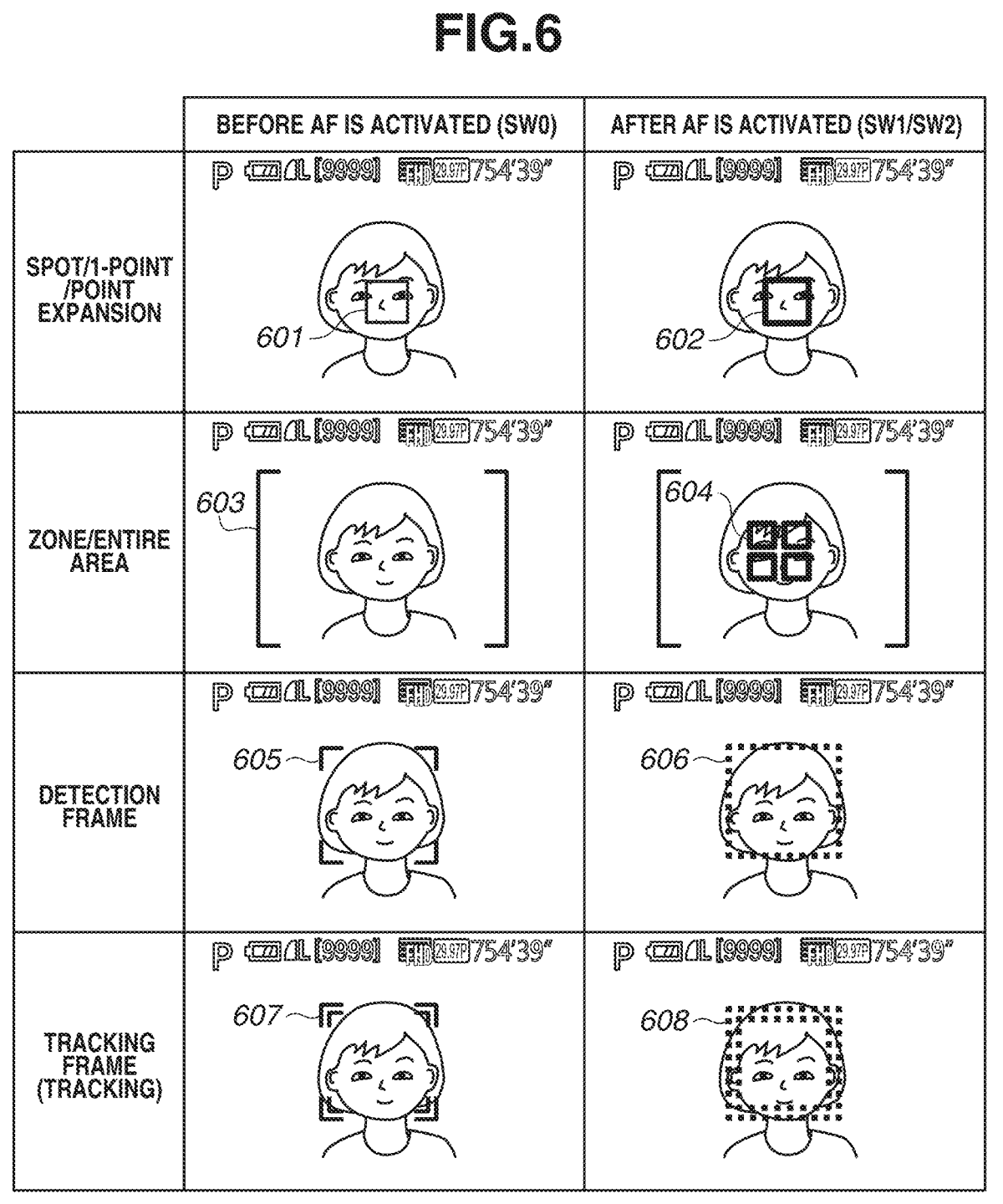

FIG. 6 is a diagram illustrating frames displayed on the display unit 28 or the EVF 29 before and after the AF activation.

In FIG. 6, different frames are displayed between before and after the activation of the AF. However, the same frames can be displayed. A distinction can be made using different colors, like a frame for one-shot AF operation is displayed in green and a frame for servo AF in blue.

An AF area frame 601 indicates a narrow area, such as a spot, single-point, and point expansion areas. The AF area frame 601 before the AF activation is a rectangle, and an AF area frame 602 after the AF activation is a thick rectangle.

An AF area frame 603 indicates a wide area, such as a zone and an entire area. Before the AF activation, the AF area frame 603 indicates the area with brackets [ ]. After the AF activation, small rectangular frames 604 are displayed only at in-focus points within the AF area frame 603. A plurality of rectangular frames 604 can be displayed in the area. If the AF area frame 603 indicates the entire screen area, the brackets [ ] may be hidden before the AF activation.

A detection frame 605 is displayed around an object automatically detected based on the object to be detected setting. In the diagram, the object to be detected is set to "human figure", and the detection frame 605 is displayed around a human face. Depending on the pupil detection setting, detection frames 605 can be displayed around pupil areas. If the object to be detected is set to "animal" or "vehicle", the detection frame 605 is displayed around the entire body or face of an animal or a vehicle. After the AF activation, a rectangular detection frame 606 is displayed according to the detection frame 605. In the present exemplary embodiment, the detection frame 606 is expressed by a dotted line for the sake of distinction from the AF area frame 602. The detection frame can be updated frame by frame to track the object. If the one-shot AF is activated, the frame position is fixed afterward at the in-focus position.

If the user selects the detection frame 605 or a tracking object by a user operation, a tracking frame 607 is displayed. Examples of the user's selection operation include selection with reference to an operation position on the touchscreen 70a, selection through a tracking start operation, and selection from a plurality of detection frames using the directional keypad 74. After the AF activation, the tracking frame is expressed by a dotted double-lined rectangle 608. Similarly to the detection frame, the tracking frame can be updated frame by frame to track the object. If the one-shot AF is activated, the tracking frame is fixed afterward at the in-focus position.

Frame Expressions Depending on Combinations of AF Area and Tracking Setting

FIG. 7 is a diagram illustrating frame expressions depending on the combinations of the AF area and the tracking setting.

States 7-A to 7-I correspond to the combinations of tracking "off" and the AF areas. States 7-J to 7-R correspond to the combinations of tracking "on" and the AF areas. Each state illustrates a case where the "AF area frame", the "detection frame", or the "tracking frame" is active.

States 7-A to 7-I where the tracking is "off" will initially be described.

If the AF area frame is active, AF area frames corresponding to the respective settings, such as a single-point AF area frame 701 and a zone AF area frame 702, are displayed (states 7-A, 7-B, and 7-C).

If the tracking is "off", the object detection processing is not performed and thus the detection frame does not become active. No frame is thus displayed in state 7-D, 7-E, or 7-F. For the convenience of description, FIG. 7 illustrates the screens in states 7-D, 7-E, and 7-F in gray, whereas an LV display is provided.

If an object is selected by the user, a tracking frame 703 is displayed (states 7-G, 7-H, and 7-I). Examples of the tracking frame here include the tracking frame when tracking is started based on an operation position on the touchscreen 70a and the tracking frame when tracking is started with reference to the position of a tracking start operation.

Next, states 7-J to 7-R where the tracking is "on" will be described.

In states 7-J to 7-O, if a main object is detected, both the AF area frame and the detection frame are displayed, and the frame to be actually used for focusing upon AF activation becomes active. If a main object is not detected, only the AF area is displayed as is the case where the tracking is "off".

With the main object detected, the frame to be actually used for focusing upon the AF activation is selected in the following manner.

Initially, if the detection frame does not overlap the AF area frame, the AF area frame becomes active (states 7-J and 7-K). If the AF area is the entire area of the screen and no object is detected within the AF area, the entire AF area becomes active (state 7-L) since the detection frame does not overlap the AF area frame. In such a case, however, the AF area frame is hidden since the AF area is the entire area of the screen. For the convenience of description, the screen is illustrated in gray, whereas an LV display is provided. If the AF area frame is active, an AF area frame 704 or 706 is displayed in solid lines, and a detection frame 705 is expressed by translucent lines. When the AF is activated, the focus is adjusted using the AF area frame.

If the detection frame overlaps the AF area frame, the detection frame becomes active (states 7-M, 7-N, and 7-O). In the cases of pupil detection and spot detection, the detection frame can be active without the pupils or the spot overlapping the AF area frame if the face or the object's entire body overlaps the AF area frame. If the detection frame is active, a detection frame 707 is expressed by solid lines and an AF area frame 708 is expressed by translucent lines.

If an object is selected by the user and a main object is detected, the tracking frame 709 is active and displayed alone during tracking (states 7-P, 7-Q, and 7-R).

State Transitions in Case of Servo AF

Figure 8A:
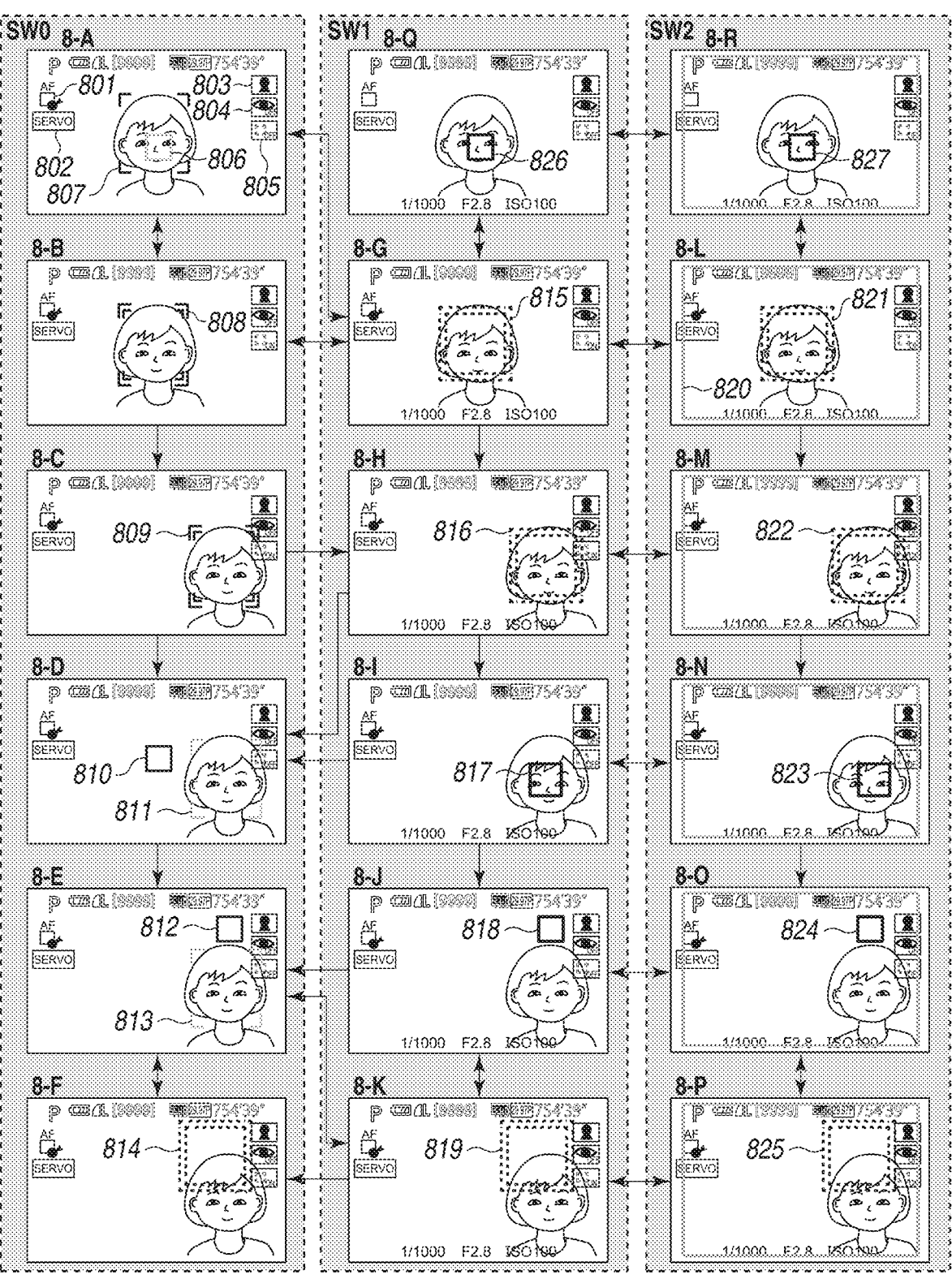
FIGS. 8A and 8B are diagrams illustrating state transitions in a case of servo AF.
Figure 8B:
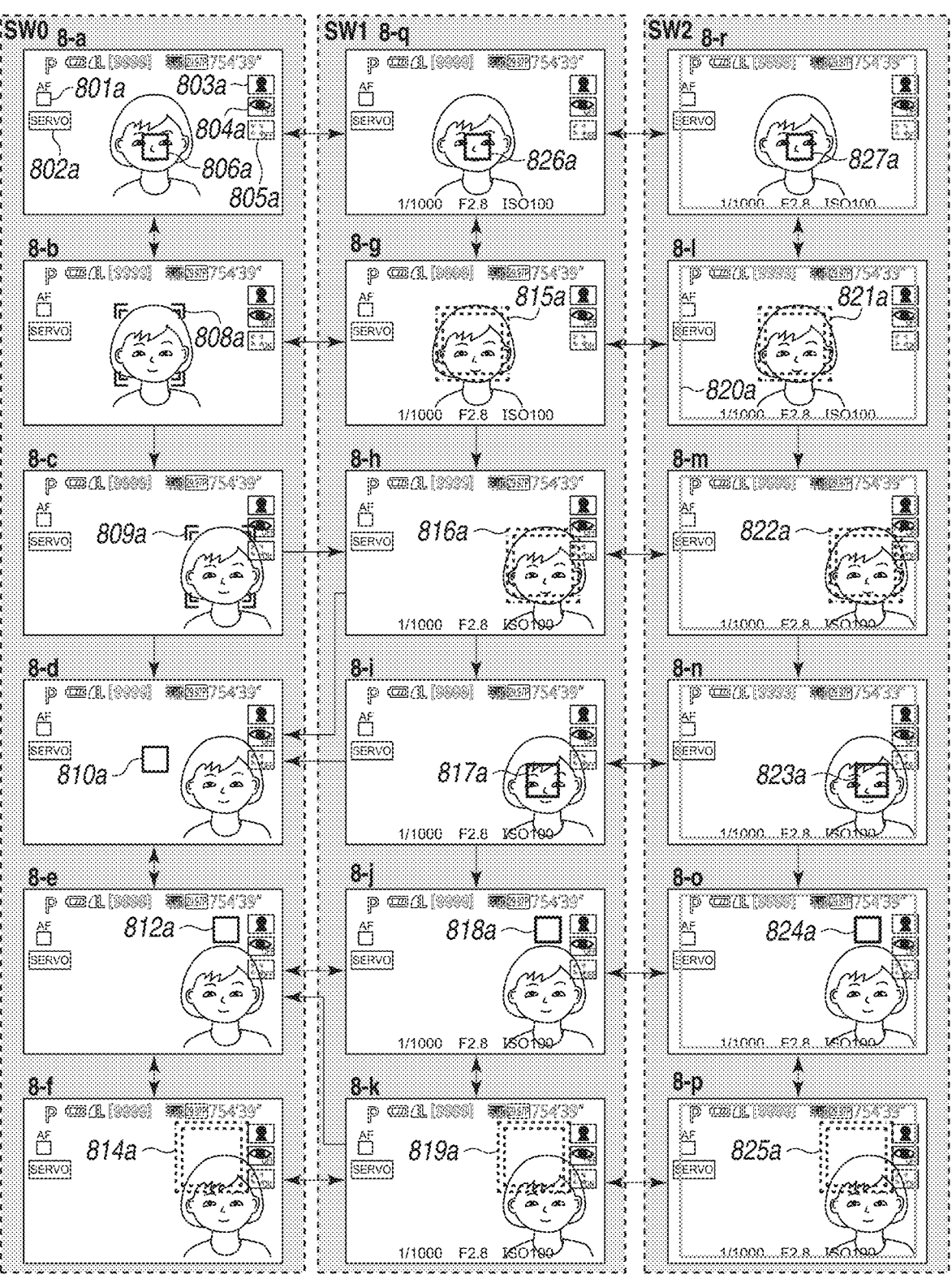

FIGS. 8A and 8B are diagrams illustrating state transitions in the case of servo AF.

FIG. 8A illustrates the transitions of states 8-A to 8-R with the tracking setting "on". FIG. 8B illustrates the transitions of states 8-a to 8-r with the tracking setting "off".

<With Tracking Setting "On">

State 8-A illustrated in FIG. 8A represents an imaging standby state (SW0). Icons 801 to 805 indicate setting values and state values. The icon 801 indicates single-point AF with the tracking setting "on". The icon 802 indicates that the AF operation is servo AF. The icon 803 indicates that the object to be detected is a human figure. The icon 804 indicates that the pupil detection is off. The icon 805 indicates that the tracking state is turned off. Since a detection frame 807 overlaps an AF area frame 806, the detection frame 807 becomes active and the AF area frame 806 inactive. If a "start tracking" operation is performed in such a state, the state proceeds to state 8-B. If an AF operation (imaging preparation operation [SW1]) is performed, the state proceeds to state 8-G.

In state 8-B, the system control unit 50 updates a tracking frame 808 to follow the movement of the object. The icon 805 is switched to on. If a "stop tracking" operation is performed in such a state, the state returns to state 8-A. If an AF operation (imaging preparation operation [SW1]) is performed, the state proceeds to state 8-G.

In state 8-C, the system control unit 50 updates a tracking frame 809 to follow the movement of the object. If a "stop tracking" operation is performed here, the state proceeds to state 8-D. If an AF operation (imaging preparation operation [SW1]) is performed, the state proceeds to state 8-H.

In state 8-D, the system control unit 50 displays an AF area frame 810 and a detection frame 811. Here, the AF area frame 810 is active. If a frame moving operation is performed in such a state, the state proceeds to state 8-E.

In state 8-E, the system control unit 50 displays an AF area frame 812 and a detection frame 813. Here, the AF area frame 812 is active. If a "start tracking" operation is performed in such a state, the state proceeds to state 8-F. If an AF operation is performed, the state proceeds to state 8-K.

In state 8-F, the system control unit 50 updates a tracking frame 814 to follow the movement of the object. The icon 805 is switched to on. If a "stop tracking" operation is performed in such a state, the state returns to state 8-E. If an AF operation (imaging preparation operation [SW1]) is performed, the state proceeds to state 8-K.

In state 8-G, the system control unit 50 updates a tracking frame 815 to follow the movement of the object while continuing to focus on the object (continuous AF). The icon 805 is switched to on. If the object to be tracked moves in such a state, the state proceeds to state 8-H. If a "stop tracking" operation is performed, the state proceeds to state 8-Q. If the AF is cancelled (imaging preparation operation

[SW1] is cancelled), the state returns to state 8-A. If an imaging operation (SW2) is performed, the state proceeds to state 8-L.

In state 8-Q, the system control unit 50 continues to focus on the object in an AF area 826. The tracking state is turned off. If an imaging operation is performed in such a state, the state proceeds to state 8-R.

In state 8-H, the system control unit 50 updates a tracking frame 816 to follow the movement of the object while continuing to focus on the object.

If a "stop tracking" operation is performed in such a state, the state proceeds to state 8-I. If an imaging operation (SW2) is performed, the state proceeds to state 8-M. If the AF is cancelled (imaging preparation operation [SW1] is cancelled), the state returns to state 8-D.

In state 8-I, the system control unit 50 continues to focus on the object in an AF area 817. The tracking state is turned off. If an imaging operation (SW2) is performed in such a state, the state proceeds to state 8-N. If the AF is cancelled (imaging preparation operation [SW1] is cancelled), the state returns to state 8-D.

In state 8-J, the system control unit 50 moves an AF area 818 according to the user's operation. When moving the AF area 818, the system control unit 50 continues to focus on the object in the AF area 818. If an imaging operation (SW2) is performed in such a state, the state proceeds to state 8-O. If the AF is cancelled (imaging preparation operation [SW1] is cancelled), the state returns to state 8-E. If a "start tracking" operation is performed, the state proceeds to state 8-K.

In state 8-K, the system control unit 50 updates a tracking frame 819 to follow the movement of the object while continuing to focus on the object.

If a "stop tracking" operation is performed in such a state, the state returns to state 8-J. If an imaging operation (SW2) is performed, the state proceeds to state 8-P. If the AF is cancelled (imaging preparation operation [SW1] is cancelled), the state returns to state 8-E or 8-F.

In state 8-L, the system control unit 50 updates a tracking frame 821 to follow the movement of the object while continuing to focus on the object, and captures an image. That imaging is in progress can be determined from display 820. If the drive mode is set to continuous shooting, the system control unit 50 tracks the focus position and continues to capture images. If the object to be tracked moves in such a state, the state proceeds to state 8-M. If the imaging operation (SW2) is cancelled, the state returns to state 8-G. If a "stop tracking" operation is performed, the state returns to state 8-R.

In state 8-R, the system control unit 50 continues to focus on the object in an AF area 827, and captures an image. The tracking state is turned off. If a "start tracking" operation is performed in such a state, the state proceeds to state 8-L. If the imaging operation (SW2) is cancelled, the state returns to state 8-Q.

In state 8-M, the system control unit 50 updates a tracking frame 822 to follow the movement of the object while continuing to focus on the object, and captures an image. If the imaging operation (SW2) is cancelled in such a state, the state returns to state 8-H. If a "stop tracking" operation is performed, the state proceeds to state 8-N.

In state 8-N, the system control unit 50 continues to focus on the object in an AF area 823, and captures an image. The tracking state is turned off. If a frame moving operation is performed in such a state, the state proceeds to state 8-O. If the imaging operation (SW2) is cancelled, the state returns to state 8-I.

In state 8-O, the system control unit 50 continues to focus on the object in an AF area 824, and captures an image. If the imaging operation (SW2) is cancelled in such a state, the state returns to state 8-J. If a "start tracking" operation is performed in such a state, the state proceeds to state 8-P.

In state 8-P, the system control unit 50 updates a tracking frame 825 to follow the movement of the object while continuing to focus on the object, and captures an image. If the imaging operation (SW2) is cancelled in such a state, the state returns to state 8-K. If a "stop tracking" operation is performed, the state returns to state 8-O.

<With Tracking Setting "Off">

State 8-*a* illustrated in FIG. 8B represents the imaging standby state. Icons 801*a* to 805*a* indicate setting values and state values. The icon 801*a* indicates single-point AF with the tracking setting "off". The icon 802*a* indicates that the AF operation is servo AF. The icon 803*a* indicates that the object to be detected is a human figure. The icon 804*a* indicates that the pupil detection is off. The icon 805*a* indicates that the tracking state is turned off. The system control unit 50 displays an AF area frame 806*a*. If a "start tracking" operation is performed in such a state, the state proceeds to state 8-*b*. If an AF operation (imaging preparation operation [SW1]) is performed, the state proceeds to state 8-*q*.

In state 8-*b*, the system control unit 50 updates a tracking frame 808*a* to follow the movement of the object. The icon 805*a* is switched to on. If a "stop tracking" operation is performed in such a state, the state returns to state 8-*a*. If an AF operation (imaging preparation operation [SW1]) is performed, the state proceeds to state 8-*g*.

In state 8-*c*, the system control unit 50 updates a tracking frame 809*a* to follow the movement of the object. If a "stop tracking" operation is performed here, the state proceeds to state 8-*d*. If an AF operation (imaging preparation operation [SW1]) is performed, the state proceeds to state 8-*h*.

In state 8-*d*, the system control unit 50 displays an AF area frame 810*a*. If a frame moving operation is performed in such a state, the state proceeds to state 8-*e*.

In state 8-*e*, the system control unit 50 displays an AF area frame 812*a*. If a "start tracking" operation is performed in such a state, the state proceeds to state 8-*f*. If an AF operation is performed, the state proceeds to state 8-*j*.

In state 8-*f*, the system control unit 50 updates a tracking frame 814*a* to follow the movement of the object. The icon 805*a* is switched to on. If a "stop tracking" operation is performed in such a state, the state returns to state 8-*e*. If an AF operation (imaging preparation operation [SW1]) is performed, the state proceeds to state 8-*k*.

In state 8-*g*, the system control unit 50 updates a tracking frame 815*a* to follow the movement of the object while continuing to focus on the object. The icon 805*a* is switched to on. If the object to be tracked moves in such a state, the state proceeds to state 8-*h*. If a "stop tracking" operation is performed, the state proceeds to state 8-*q*. If the AF is cancelled, the state returns to state 8-*b*. If an imaging operation (SW2) is performed, the state proceeds to state 8-*l*.

In state 8-*q*, the system control unit 50 continues to focus on the object in an AF are 826*a*. The tracking state is turned off. If an imaging operation (SW2) is performed in such a state, the state proceeds to state 8-*r*.

In state 8-*h*, the system control unit 50 updates a tracking frame 816*a* to follow the movement of the object while continuing to focus on the object. If a "stop tracking" operation is performed in such a state, the state proceeds to state 8-*i*. If an imaging operation (SW2) is performed, the state proceeds to state 8-*m*. If the AF is cancelled (imaging preparation operation [SW1] is cancelled), the state returns to state 8-*d*.

In state 8-*i*, the system control unit 50 continues to focus on the object in an AF area 817*a*. The tracking state is turned off. If an imaging operation (SW2) is performed in such a state, the state proceeds to state 8-*n*. If the AF is cancelled (imaging preparation operation [SW1] is cancelled), the state returns to state 8-*d*.

In state 8-*j*, the system control unit 50 moves an AF area 818*a* based on the user's operation. When moving the AF area 818*a*, the system control unit 50 continues to focus on the object in the AF area 818*a*. If an imaging operation (SW2) is performed in such a state, the state proceeds to state 8-*o*. If the AF is cancelled (imaging preparation operation [SW1] is cancelled), the state returns to state 8-*e*. If a "start tracking" operation is performed, the state proceeds to state 8-*k*.

In state 8-*k*, the system control unit 50 updates a tracking frame 819*a* to follow the movement of the object while continuing to focus on the object. If a "stop tracking" operation is performed in such a state, the state returns to state 8-*j*. If an imaging operation (SW2) is performed, the state proceeds to state 8-*p*. If the AF is cancelled (imaging preparation operation [SW1] is cancelled), the state returns to state 8-*e* or 8-*f*.

In state 8-*l*, the system control unit 50 updates a tracking frame 821*a* to follow the movement of the object while continuing to focus on the object, and captures an image. That imaging is in progress can be determined from display 820*a*. If the drive mode is set to continuous shooting, the system control unit 50 tracks the focus position and continues to capture images. If the object to be tracked moves in such a state, the state proceeds to state 8-*m*. If the imaging operation (SW2) is cancelled, the state returns to state 8-*g*. If a "stop tracking" operation is performed, the state returns to state 8-*r*.

In state 8-*r*, the system control unit 50 continues to focus on the object in an AF area 827*a*, and captures an image. The tracking state is turned off. If a "start tracking" operation is performed in such a state, the state proceeds to state 8-*l*. If the imaging operation (SW2) is cancelled, the state returns to state 8-*q*.

In state 8-*m*, the system control unit 50 updates a tracking frame 822*a* to follow the movement of the object while continuing to focus on the object, and captures an image. If the imaging operation (SW2) is cancelled in such a state, the state returns to state 8-*h*. If a "stop tracking" operation is performed, the state returns to state 8-*n*.

In state 8-*n*, the system control unit 50 continues to focus on the object in an AF area 823*a*, and captures an image. The tracking state is turned off. If a frame moving operation is performed in such a state, the state proceeds to state 8-*o*. If the imaging operation (SW2) is cancelled, the state returns to state 8-*i*.

In state 8-*o*, the system control unit 50 continues to focus on the object in an AF area 824*a*, and captures an image. If the imaging operation (SW2) is cancelled in such a state, the state returns to state 8-*j*. If a "start tracking" operation is performed, the state proceeds to state 8-*p*.

In state 8-*p*, the system control unit 50 updates a tracking frame 825*a* to follow the movement of the object while continuing to focus on the object, and captures an image. If the imaging operation (SW2) is cancelled in such a state, the state returns to state 8-*k*. If a "stop tracking" operation is performed, the state returns to state 8-*o*.

State Transitions in Case of One-Shot AF

Figure 9A:
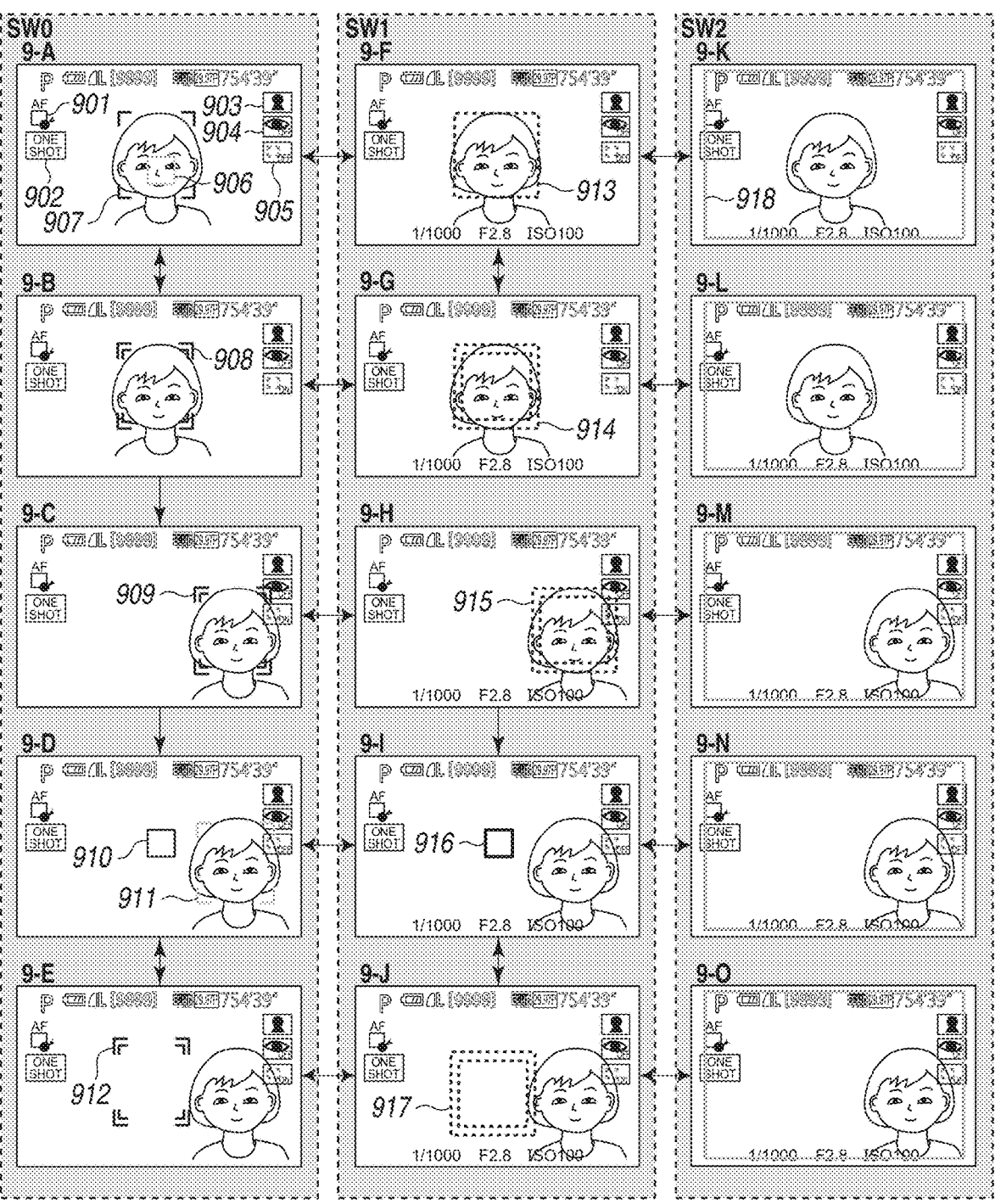
FIGS. 9A and 9B are diagrams illustrating state transitions in a case of one-shot AF.
Figure 9B:
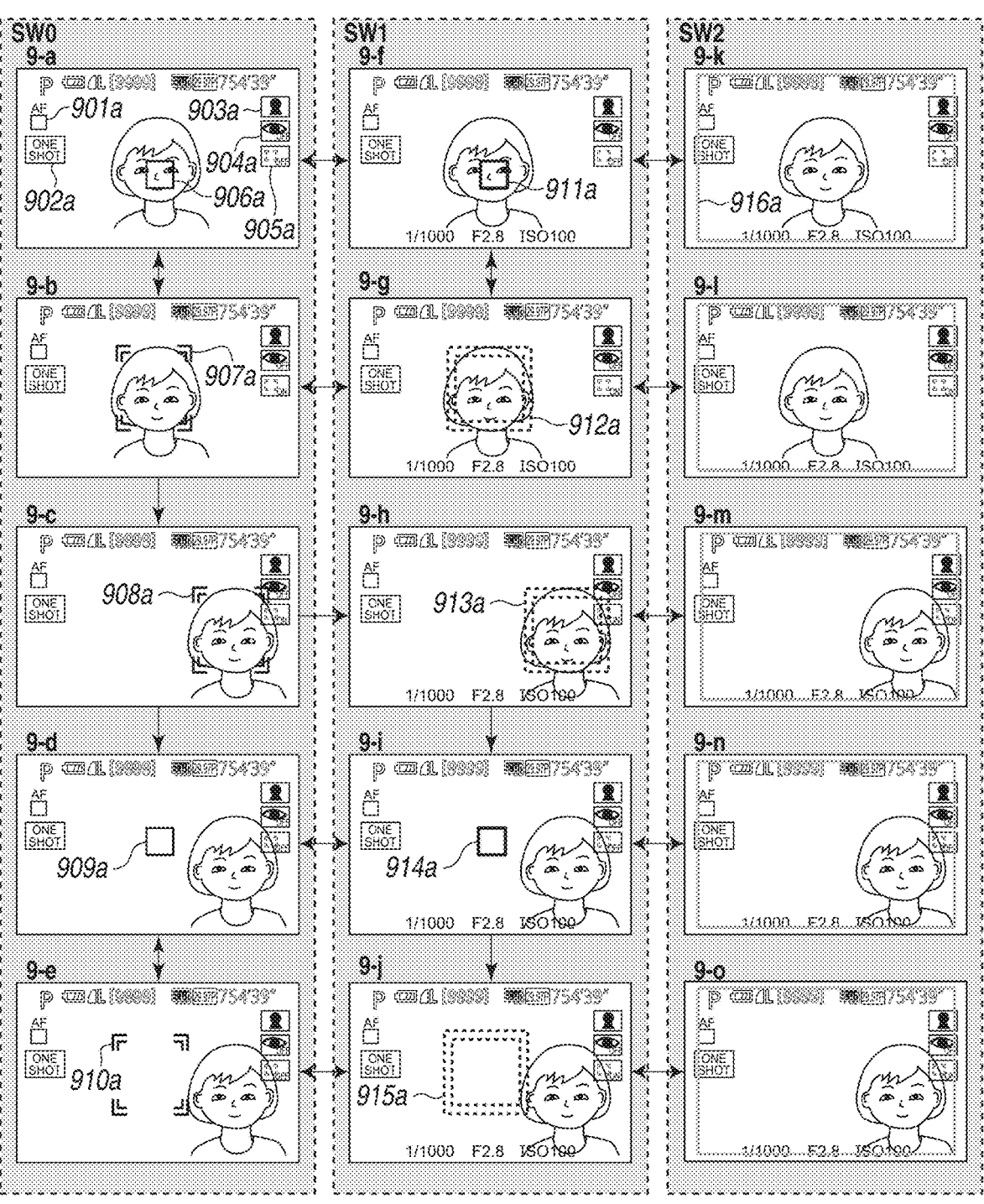

FIGS. 9A and 9B are diagrams illustrating state transitions in the case of one-shot AF.

FIG. 9A illustrates the transitions of states 9-A to 9-O with the tracking setting "on". FIG. 9B illustrates the transitions of states 9-a to 9-o with the tracking setting "off".

<With Tracking Setting "On">

In state 9-A illustrated in FIG. 9A, the system control unit 50 displays icons 901 to 905 indicating setting values and state values. The icon 901 indicates single-point AF with the tracking setting "on". The icon 902 indicates that the AF operation is one-shot AF. The icon 903 indicates that the object to be detected is a human figure. The icon 904 indicates that the pupil detection is off. The icon 905 indicates that the tracking setting is off. Since a detection frame 907 overlaps an AF area frame 906, the detection frame 907 becomes active and the AF area frame 906 inactive. If a "start tracking" operation is performed in such a state, the state proceeds to state 9-B. If an AF operation (imaging preparation operation [SW1]) is performed, the state proceeds to state 9-F.

In state 9-B, the system control unit 50 tracks the object using a tracking frame 908. The icon 905 is switched to on. If a "stop tracking" operation is performed in such a state, the state returns to state 9-A. If an AF operation (imaging preparation operation [SW1]) is performed, the state proceeds to state 9-G. If the object moves in XY directions of the screen, the state proceeds to state 9-C.

In state 9-C, the system control unit 50 updates a tracking frame 909 to follow the movement of the object. If a "stop tracking" operation is performed in such a state, the state proceeds to state 9-D. If an AF operation (imaging preparation operation [SW1]) is performed, the state proceeds to state 9-H.

In state 9-D, a detection frame 911 falls outside an AF area frame 910, and thus the AF area frame 910 becomes active and the detection frame 911 inactive. If a "start tracking" operation is performed in such a state, the state proceeds to state 9-E. If an AF operation (imaging preparation operation [SW1]) is performed, the state proceeds to state 9-I.

In state 9-E, the system control unit 50 updates a tracking frame 912 to follow the movement of the object to be tracked. The icon 905 is switched to on. If a "stop tracking" operation is performed in such a state, the state returns to state 9-D. If an AF operation (imaging preparation operation [SW1]) is performed, the state proceeds to state 9-J.

In state 9-F, the system control unit 50 performs one-shot AF using a detection frame 913, and locks the focus position. If an imaging operation (SW2) is performed in such a state, the state proceeds to state 9-K. If a "start tracking" operation is performed, the state proceeds to state 9-G. If the AF operation (imaging preparation operation [SW1]) is cancelled, the state returns to state 9-A.

In state 9-G, the system control unit 50 performs one-shot AF using a tracking frame 914, and locks the focus position. If a "stop tracking" operation is performed in such a state, the state returns to state 9-F. If an imaging operation (SW2) is performed, the state proceeds to state 9-L. If the AF operation (imaging preparation operation [SW1]) is cancelled, the state returns to state 9-B.

In state 9-H, the system control unit 50 performs one-shot AF using a tracking frame 915, and locks the focus position. If a "stop tracking" operation is performed in such a state, the state proceeds to state 9-I. If an imaging operation (SW2) is performed, the state proceeds to state 9-M. If the AF operation (imaging preparation operation [SW1]) is cancelled, the state returns to state 9-C.

In state 9-I, the system control unit 50 performs one-shot AF using an AF area frame 916, and locks the focus position.

If a "start tracking" operation is performed in such a state, the state proceeds to state 9-J. If an imaging operation (SW2) is performed, the state proceeds to state 9-N. If the AF operation (imaging preparation operation [SW1]) is cancelled, the state returns to state 9-D.

In state 9-J, the system control unit 50 performs one-shot AF using a tracking frame 917, and locks the focus position. The icon 905 is switched to on. If a "stop tracking" operation is performed in such a state, the state returns to state 9-I. If an imaging operation (SW2) is performed, the state proceeds to state 9-O. If the AF operation (imaging preparation operation [SW1]) is cancelled, the state returns to state 9-E.

In state 9-K, the system control unit 50 captures an image with the focus position locked. Here, the system control unit 50 hides the detection frame 913. Display 918 indicates that imaging is in progress. In this state, operations such as a "stop tracking" operation are unable to be performed. If the imaging operation (SW2) is cancelled, the state returns to state 9-F.

In state 9-L, the system control unit 50 captures an image with the focus position locked. Here, the system control unit 50 hides the tracking frame 914. In this state, operations such as a "stop tracking" operation are unable to be performed. If the imaging operation (SW2) is cancelled, the state returns to state 9-G.

In state 9-M, the system control unit 50 captures an image with the focus position locked. Here, the system control unit 50 hides the tracking frame 915. In this state, operations such as a "stop tracking" operation are unable to be performed. If the imaging operation (SW2) is cancelled, the state returns to state 9-H.

In state 9-N, the system control unit 50 captures an image with the focus position locked. Here, the system control unit 50 hides the AF area frame 916. In this state, operations such as a "stop tracking" operation are unable to be performed. If the imaging operation (SW2) is cancelled, the state returns to state 9-I.

In state 9-O, the system control unit 50 captures an image with the focus position locked. Here, the system control unit 50 hides the tracking frame 917. In this state, operations such as a "stop tracking" operation are unable to be performed. If the imaging operation (SW2) is cancelled, the state returns to state 9-J.

<With Tracking Setting "Off">

In state 9-a illustrated in FIG. 9B, the system control unit 50 displays icons 901a to 905a indicating setting values and state values. The icon 901a indicates single-point AF with the tracking setting "off". The icon 902a indicates that the AF operation is one-shot AF. The icon 903a indicates that the object to be detected is a human figure. The icon 904a indicates that the pupil detection is off. The icon 905a indicates that the tracking state is turned off. The system control unit 50 also displays an AF area frame 906a. If a "start tracking" operation is performed in such a state, the state proceeds to state 9-b. If an AF operation (imaging preparation operation [SW1]) is performed, the state proceeds to state 9-f.

In state 9-b, the system control unit 50 tracks the object using a tracking frame 907a. The icon 905a is switched to on. If a "stop tracking" operation is performed in such a state, the state returns to state 9-a. If an AF operation (imaging preparation operation [SW1]) is performed in such a state, the state proceeds to state 9-g. If the object moves in the XY directions of the screen, the state proceeds to state 9-c.

In state 9-*c*, the system control unit 50 updates a tracking frame 908*a* to follow the movement of the object. If a "stop tracking" operation is performed in such a state, the state proceeds to state 9-*d*. If an AF operation (imaging preparation operation [SW1]) is performed, the state proceeds to state 9-*h*.

In state 9-*d*, the system control unit 50 displays an AF area frame 909*a*. If a "start tracking" operation is performed in such a state, the state proceeds to state 9-*e*. If an AF operation (imaging preparation operation [SW1]) is performed, the state proceeds to state 9-*i*.

In state 9-*e*, the system control unit 50 updates a tracking frame 910*a* to follow the movement of the object. The icon 905*a* is switched to on. If a "stop tracking" operation is performed in such a state, the state returns to state 9-*d*. If an AF operation (imaging preparation operation [SW1]) is performed, the state proceeds to state 9-*j*.

In state 9-*f*, the system control unit 50 performs one-shot AF using an AF area frame 911*a*, and locks the focus position. If an imaging operation (SW2) is performed in such a state, the state proceeds to state 9-*k*. If a "start tracking" operation is performed, the state proceeds to state 9-*g*. If the AF operation (imaging preparation operation [SW1]) is cancelled, the state returns to state 9-*a*.

In state 9-*g*, the system control unit 50 performs one-shot AF using a tracking frame 912*a*, and locks the focus position. If a "stop tracking" operation is performed in such a state, the state returns to state 9-*f*. If an imaging operation (SW2) is performed, the state proceeds to state 9-*l*. If the AF operation (imaging preparation operation [SW1]) is cancelled, the state returns to state 9-*b*.

In state 9-*h*, the system control unit 50 performs one-shot AF using a tracking frame 913*a*, and locks the focus position. If a "stop tracking" operation is performed in such a state, the state proceeds to state 9-*i*. If an imaging operation (SW2) is performed, the state proceeds to state 9-*m*. If the AF operation (imaging preparation operation [SW1]) is cancelled, the state returns to state 9-*c*.

In state 9-*i*, the system control unit 50 performs one-shot AF using an AF area frame 914*a*, and locks the focus position. If a "start tracking" operation is performed in such a state, the state proceeds to state 9-*j*. If an imaging operation (SW2) is performed, the state proceeds to state 9-*n*. If the AF operation (imaging preparation operation [SW1]) is cancelled, the state returns to state 9-*d*.

In state 9-*j*, the system control unit 50 performs one-shot AF using a tracking frame 915*a*, and locks the focus position. The icon 905*a* is switched to on. If a "stop tracking" operation is performed in such a state, the state returns to state 9-*i*. If an imaging operation (SW2) is performed, the state proceeds to state 9-*o*. If the AF operation (imaging preparation operation [SW1]) is cancelled, the state returns to state 9-*e*.

In state 9-*k*, the system control unit 50 captures an image with the focus position locked. Here, the system control unit 50 hides the AF area frame 911*a*. Display 916*a* indicates that imaging is in progress. In this state, operations such as a "stop tracking" operation are unable to be performed. If the imaging operation (SW2) is cancelled, the state returns to state 9-*f*.

In state 9-*l*, the system control unit 50 captures an image with the focus position locked. Here, the system control unit 50 hides the tracking frame 912*a*. In this state, operations such as a "stop tracking" operation are unable to be performed. If the imaging operation (SW2) is cancelled, the state returns to state 9-*g*.

In state 9-*m*, the system control unit 50 captures an image with the focus position locked. Here, the system control unit 50 hides the tracking frame 913*a*. In this state, operations such as a "stop tracking" operation are unable to be performed. If the imaging operation (SW2) is cancelled, the state returns to state 9-*h*.

In state 9-*n*, the system control unit 50 captures an image with the focus position locked. Here, the system control unit 50 hides the AF area frame 914*a*. In this state, operations such as a "stop tracking" operation are unable to be performed. If the imaging operation (SW2) is cancelled, the state returns to state 9-*i*.

In state 9-*o*, the system control unit 50 captures an image with the focus position locked. Here, the system control unit 50 hides the tracking frame 915*a*. In this state, operations such as a "stop tracking" operation are unable to be performed. If the imaging operation (SW2) is cancelled, the state returns to state 9-*j*.

Control Procedure in Case of Servo AF

Figure 10B:
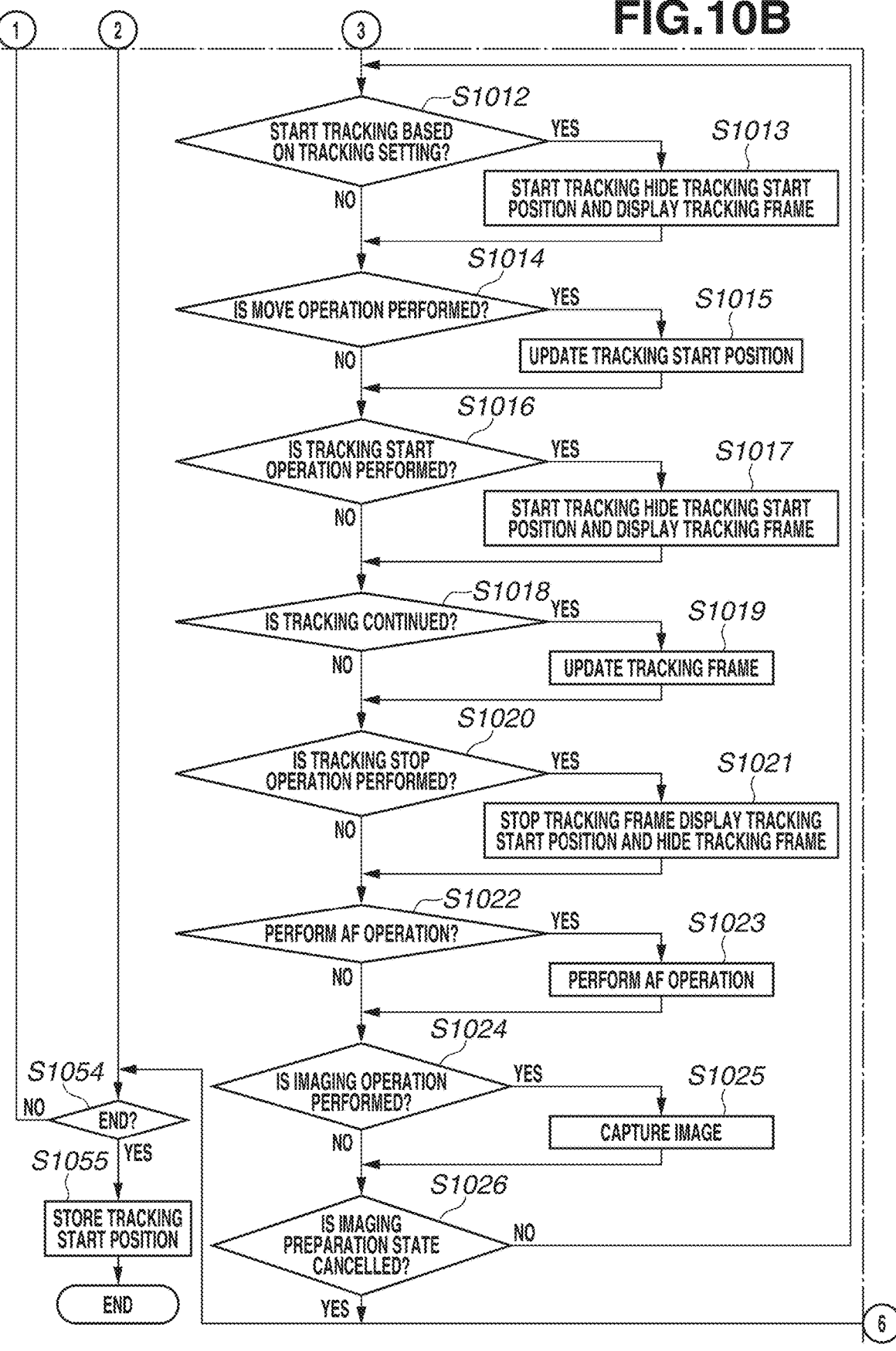
Figure 10C:
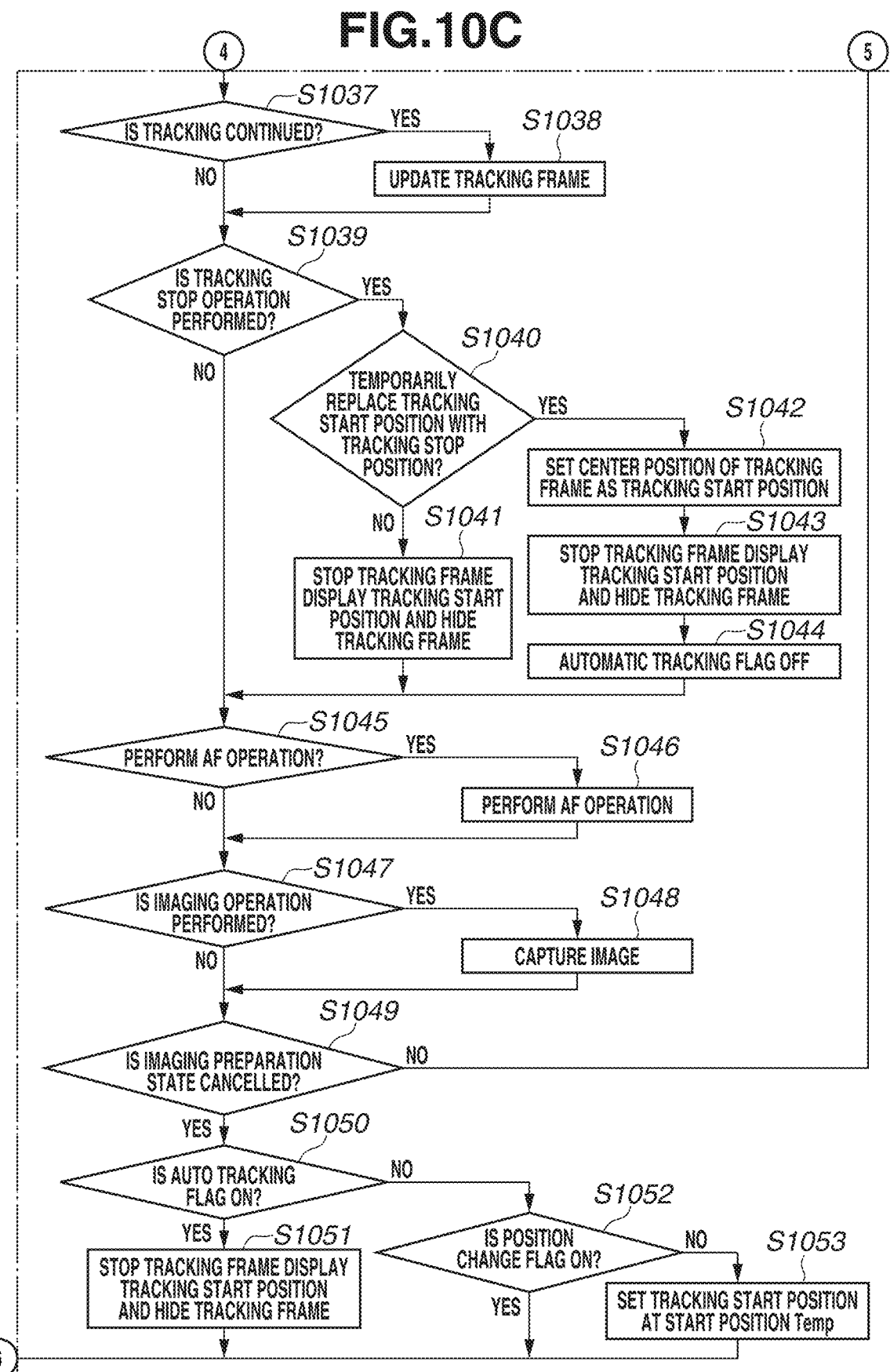

FIGS. 10A to 10C illustrate a flowchart of control in the case of servo AF. The processes are implemented by the system control unit 50 loading a program stored in the nonvolatile memory 56 into the system memory 52 and executing the loaded program.

In the following flowchart, the processing and control are performed by the system control unit 50.

In step S1001, the system control unit 50 reads a tracking start position from the storage area (nonvolatile memory 56).

In step S1002, the system control unit 50 determines whether a move operation to move the tracking start position is performed. If a move operation is performed (YES in step S1002), the processing proceeds to step S1003. If not (NO in step S1002), the processing proceeds to step S1004. Examples of the move operation in the present exemplary embodiment include a frame movement using the MC 65 or the directional keypad 74, and a frame movement using a touch.

In step S1003, the system control unit 50 updates the tracking start position based on the move operation to move the tracking start position (e.g., from state 8-D to state 8-E).

In step S1004, the system control unit 50 determines whether a tracking start operation is performed. If a tracking start operation is performed (YES in step S1004), the processing proceeds to step S1005. If not (NO in step S1004), the processing proceeds to step S1006. Examples of the tracking start operation in the present exemplary embodiment include the customized button function "start tracking".

In step S1005, the system control unit 50 detects an object at the tracking start position, determines a main object, and starts tracking. In starting tracking, the system control unit 50 hides the tracking start position (AF area frame) and displays a tracking frame (e.g., from state 8-E to state 8-F).

In step S1006, the system control unit 50 determines whether tracking is continued. If tracking is continued (YES in step S1006), the processing proceeds to step S1007. If tracking is not continued (NO in step S1006), the processing proceeds to step S1008.

In step S1007, the system control unit 50 updates the tracking frame. The system control unit 50 updates the tracking frame to follow the movement of the object (e.g., from state 8-B to state 8-C).

In step S1008, the system control unit 50 determines whether a tracking stop operation is performed. If a tracking stop operation is performed (YES in step S1008), the processing proceeds to step S1009. If not (NO in step S1008), the processing proceeds to step S1010.

In step S1009, the system control unit 50 stops the tracking frame. Here, the system control unit 50 hides the tracking frame and displays the tracking start position (AF area frame). The system control unit 50 here reads the stored tracking start position and sets the tracking start position (e.g., from state 8-C to state 8-D).

In step S1010, the system control unit 50 determines whether an imaging preparation operation is performed. If an imaging preparation operation is performed (YES in step S1010), the processing proceeds to step S1011. If not (NO in step S1010), the processing proceeds to step S1054. An example of the imaging preparation operation in the present exemplary embodiment is the half-pressing of the shutter button 61 (e.g., from state 8-A to state 8-J).

In step S1011, the system control unit 50 determines whether the setting to hold the frame position when tracking is stopped (FIG. 3E) on the menu setting is on. If the setting is on (YES in step S1011), the processing proceeds to step S1027. If the setting is off (NO in step S1011), the processing proceeds to step S1012.

In step S1012, the system control unit 50 determines whether to activate tracking (automatic tracking) based on the tracking setting. The determination criterion is that the imaging standby state transitions to the imaging preparation state when tracking is off and the tracking setting is "on". If the system control unit 50 determines to activate automatic tracking (YES in step S1012), the processing proceeds to step S1013. If not (NO in step S1012), the processing proceeds to step S1014.

In step S1013, the system control unit 50 detects an object at the tracking start position, determines a main object, and starts tracking. In starting tracking, the system control unit 50 hides the tracking start position (AF area frame) and displays a tracking frame (e.g., from state 8-A to state 8-G).

In step S1014, the system control unit 50 determines whether a move operation to move the tracking start position is performed. If a move operation is performed (YES in step S1014), the processing proceeds to step S1015. If not (NO in step S1014), the processing proceeds to step S1016. Examples of the move operation in the present exemplary embodiment include a frame movement using the MC 65 or the directional keypad 74, and a frame movement using a touch.

In step S1015, the system control unit 50 updates the tracking start position based on the move operation to move the tracking start position (e.g., from state 8-I to state 8-J).

In step S1016, the system control unit 50 determines whether a tracking start operation is performed. If a tracking start operation is performed (YES in step S1016), the processing proceeds to step S1017. If not (NO in step S1016), the processing proceeds to step S1018. Examples of the tracking start operation in the present exemplary embodiment include the customized button function "start tracking".

In step S1017, the system control unit 50 detects an object at the tracking start position, determines a main object, and starts tracking. In starting tracking, the system control unit 50 hides the tracking start position (AF area frame) and displays a tracking frame (e.g., from state 8-J to state 8-K).

In step S1018, the system control unit 50 determines whether tracking is continued. If tracking is continued (YES in step S1018), the processing proceeds to step S1019. If tracking is not continued (NO in step S1018), the processing proceeds to step S1020.

In step S1019, the system control unit 50 updates the tracking frame. The system control unit 50 updates the tracking frame to follow the movement of the object (e.g., from state 8-G to state 8-H).

In step S1020, the system control unit 50 determines whether a tracking stop operation is performed. If a tracking stop operation is performed (YES in step S1020), the processing proceeds to step S1021. If not (NO in step S1020), the processing proceeds to step S1022.

In step S1021, the system control unit 50 stops the tracking frame. Here, the system control unit 50 hides the tracking frame and displays the original tracking start position (AF area frame).

In step S1022, the system control unit 50 determines whether to perform an AF operation. If the system control unit 50 determines to perform an AF operation (YES in step S1022), the processing proceeds to step S1023. If not (NO in step S1022), the processing proceeds to step S1024.

In step S1023, the system control unit 50 performs an AF operation. Examples of the AF operation in the present exemplary embodiment include a servo operation. In the case of the servo operation, the system control unit 50 performs the servo operation for focus tracking each time.

In step S1024, the system control unit 50 determines whether an imaging operation is performed. If an imaging operation is performed (YES in step S1024), the processing proceeds to step S1025. If not (NO in step S1024), the processing proceeds to step S1026.

In step S1025, the system control unit 50 captures an image. In the present exemplary embodiment, the system control unit 50 captures an image based on the second shutter switch signal SW2 (e.g., from state 8-G to state 8-L).

In step S1026, the system control unit 50 determines whether the imaging preparation state is cancelled. If the imaging preparation state is cancelled (YES in step S1026), the processing proceeds to step S1054. If the imaging preparation state is not cancelled (NO in step S1026), the processing returns to step S1012.

In step S1027, the system control unit 50 turns off a position change flag and an automatic tracking flag to be controlled within the procedure.

In step S1028, the system control unit 50 temporarily stores the tracking start position into the system memory 52. In this procedure, the stored tracking start position is defined as a start position Temp.

In step S1029, the system control unit 50 determines whether to activate tracking (automatic tracking) based on the tracking setting. The determination criterion is that the imaging standby state transitions to the imaging preparation state when tracking is off and the tracking setting is "on". If the system control unit 50 determines to activate automatic tracking (YES in step S1029), the processing proceeds to step S1030. If not (NO in step S1029), the processing proceeds to step S1032.

In step S1030, the system control unit 50 detects an object at the tracking start position, determines a main object, and starts tracking. In starting tracking, the system control unit 50 hides the tracking start position (AF area frame) and displays a tracking frame (e.g., from state 8-A to state 8-G).

In step S1031, the system control unit 50 turns the automatic tracking flag on.

In step S1032, the system control unit 50 determines whether a move operation to move the tracking start position is performed. If a move operation is performed (YES in step S1032), the processing proceeds to step S1033. If not (NO in step S1032), the processing proceeds to step S1035. Examples of the move operation in the present exemplary embodiment include a frame movement using the MC 65 or the directional keypad 74, and a frame movement using a touch.

In step S1033, the system control unit 50 updates the tracking start position based on the move operation to move the tracking start position (e.g., from state 8-I to state 8-J).

In step S1034, the system control unit 50 turns the position change flag on.

In step S1035, the system control unit 50 determines whether a tracking start operation is performed. If a tracking start operation is performed (YES in step S1035), the processing proceeds to step S1036. If not (NO in step S1035), the processing proceeds to step S1037. Examples of the tracking start operation in the present exemplary embodiment include the customized button function "start tracking".

In step S1036, the system control unit 50 detects an object at the tracking start position, determines a main object, and starts tracking. In starting tracking, the system control unit 50 hides the tracking start position (AF area frame) and displays the tracking frame (e.g., from state 8-J to state 8-K).

In step S1037, the system control unit 50 determines whether tracking is continued. If tracking is continued (YES in step S1037), the processing proceeds to step S1038. If tracking is not continued (NO in step S1037), the processing proceeds to step S1039.

In step S1038, the system control unit 50 updates the tracking frame. The system control unit 50 updates the tracking frame to follow the movement of the object (e.g., from state 8-G to state 8-H).

In step S1039, the system control unit 50 determines whether a tracking stop operation is performed. If a tracking stop operation is performed (YES in step S1039), the processing proceeds to step S1040. If not (NO in step S1039), the processing proceeds to step S1045.

In step S1040, the system control unit 50 determines whether to temporarily replace the tracking start position with the tracking stop position. If the system control unit 50 determines to replace the tracking start position with the tracking stop position (YES in step S1040), the processing proceeds to step S1042. If not (NO in step S1040), the processing proceeds to step S1041. The present exemplary embodiment proposes control in the case of replacing the tracking start position with the tracking-stopped position. As another exemplary embodiment, the system control unit 50 can change control when a start and stop of tracking are switched each time a button is pressed and when the start and stop of tracking are switched only while the button is pressed. In such a case, if the start and stop of tracking are switched each time the button is pressed (FIG. 4B), the processing proceeds to step S1041. If the start and stop of tracking are switched only while the button is pressed (FIG. 4F), the processing proceeds to step S1042. The processing can branch the other way around. While in the present exemplary embodiment the tracking start position is assumed to be replaced, the tracking start position can be set based on a criterion combined with the setting to hold the tracking stop position in step S1011.

In step S1041, the system control unit 50 stops the tracking frame. Here, the system control unit 50 hides the tracking frame and displays the original tracking start position (AF area frame) (e.g., from state 8-H to state 8-I).

In step S1042, the system control unit 50 sets the center position of the current tracking frame as the tracking start position. This processing is characteristic of the present exemplary embodiment, and intended to place emphasis on the continuity of tracking in the imaging preparation state.

In step S1043, the system control unit 50 stops the tracking frame. Here, the system control unit 50 hides the tracking frame and displays the tracking start position (AF area frame) at the position set in step S1042 (e.g., from state 8-H to state 8-I).

In step S1044, the system control unit 50 turns the automatic tracking flag off. As another exemplary embodiment, the processing of step S1044 can be skipped and the tracking in step S1014 can be clarified to modify control to easy-to-understand specifications.

In step S1045, the system control unit 50 determines whether to perform an AF operation. If the system control unit 50 determines to perform an AF operation (YES in step S1045), the processing proceeds to step S1046. If not (NO in step S1045), the processing proceeds to step S1047.

In step S1046, the system control unit 50 performs an AF operation. Examples of the AF operation in the present exemplary embodiment include a servo operation. In the case of the servo operation, the system control unit 50 performs the servo operation for focus tracking each time.

In step S1047, the system control unit 50 determines whether an imaging operation is performed. If an imaging operation is performed (YES in step S1047), the processing proceeds to step S1048. If not (NO in step S1047), the processing proceeds to step S1049.

In step S1048, the system control unit 50 captures an image. In the present exemplary embodiment, the system control unit 50 captures an image based on the second shutter switch signal SW2 (e.g., from state 8-G to state 8-L).

In step S1049, the system control unit 50 determines whether the imaging preparation state is cancelled. If the imaging preparation state is cancelled (YES in step S1049), the processing proceeds to step S1050. If the imaging preparation state is not cancelled (NO in step S1049), the processing returns to step S1032.

In step S1050, the system control unit 50 determines the state of the automatic tracking flag. If the automatic tracking flag is on (YES in step S1050), the processing proceeds to step S1051. If the automatic tracking flag is off (NO in step S1050), the processing proceeds to step S1052.

In step S1051, the system control unit 50 stops the tracking frame. Here, the system control unit 50 hides the tracking frame and displays the tracking start position (AF area frame) at the position set in step S1042 (e.g., from state 8-G to state 8-A)

In step S1052, the system control unit 50 determines the state of the position change flag. If the position change flag is on (YES in step S1052), the processing proceeds to step S1054 (e.g., from state 8-J to state 8-E). If the position change flag is off (NO in step S1052), the processing proceeds to step S1053.

In step S1053, the system control unit 50 sets the tracking start position at the start position Temp (e.g., from state 8-I to state 8-D).

In step S1054, the system control unit 50 determines whether to end this procedure. If the system control unit 50 determines to end this procedure (YES in step S1054), the processing proceeds to step S1055. If not (NO in step S1054), the processing proceeds to step S1002.

In step S1055, the system control unit 50 stores the tracking start position into the storage area (nonvolatile memory 56). The processing ends.

Control Procedure in Case of One-Shot AF

Figure 11:
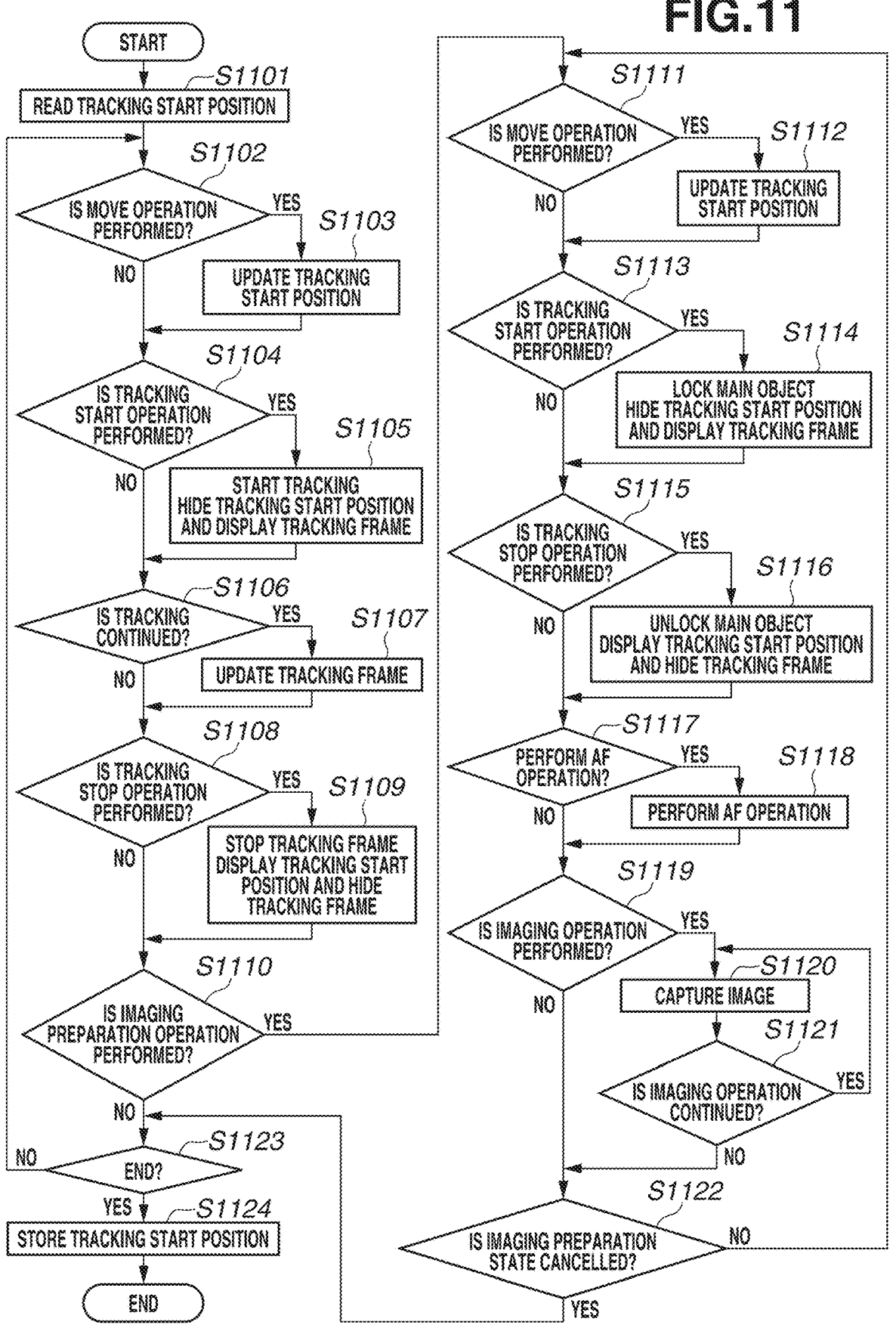
FIG. 11 is a flowchart illustrating control in the case of one-shot AF.

FIG. 11 is a flowchart illustrating control in the case of one-shot AF. The processes are implemented by the system control unit 50 loading a program stored in the nonvolatile memory 56 into the system memory 52 and executing the loaded program.

In the following flowchart, the processing and control are performed by the system control unit 50.

In step S1101, the system control unit 50 reads the tracking start position (AF area) from the storage area (nonvolatile memory 56).

In step S1102, the system control unit 50 determines whether a move operation to move the tracking start position is performed. If a move operation is performed (YES in step S1102), the processing proceeds to step S1103. If not (NO in step S1102), the processing proceeds to step S1104. Examples of the move operation in the present exemplary embodiment include a frame movement using the MC 65 or the directional keypad 74, and a frame movement using a touch.

In step S1103, the system control unit 50 updates the tracking start position based on the move operation to move the tracking start position.

In step S1104, the system control unit 50 determines whether a tracking start operation is performed. If a tracking start operation is performed (YES in step S1104), the processing proceeds to step S1105. If not (NO in step S1104), the processing proceeds to step S1106. Examples of the tracking start operation in the present exemplary embodiment include the customized button function "start tracking".

In step S1105, the system control unit 50 detects an object at the tracking start position, determines a main object, and starts tracking. In starting tracking, the system control unit 50 hides the tracking start position (AF area frame) and displays a tracking frame (e.g., from state 9-D to state 9-E, or from state 9-*a* to state 9-*b*)

In step S1106, the system control unit 50 determines whether tracking is continued. If tracking is continued (YES in step S1106), the processing proceeds to step S1107. If tracking is not continued (NO in step S1106), the processing proceeds to step S1108.

In step S1107, the system control unit 50 updates the tracking frame. The system control unit 50 updates the tracking frame to follow the movement of the object (e.g., from state 9-B to state 9-C).

In step S1108, the system control unit 50 determines whether a tracking stop operation is performed. If a tracking stop operation is performed (YES in step S1108), the processing proceeds to step S1109. If not (NO in step S1108), the processing proceeds to step S1110.

In step S1109, the system control unit 50 stops the tracking frame. Here, the system control unit 50 hides the tracking frame and displays the tracking start position (AF area frame). The system control unit 50 here reads the stored tracking start position and sets the tracking start position (e.g., from state 9-C to state 9-D)

In step S1110, the system control unit 50 determines whether an imaging preparation operation is performed. If an imaging preparation operation is performed (YES in step S1110), the processing proceeds to step S1111. If not (NO in step S1110), the processing proceeds to step S1123. An example of the imaging preparation operation in the present exemplary embodiment is the half-pressing of the shutter button 61 (e.g., from state 9-A to state 9-F)

In step S1111, the system control unit 50 determines whether a move operation to move the tracking start position is performed. If a move operation is performed (YES in step S1111), the processing proceeds to step S1112. If not (NO in step S1111), the processing proceeds to step S1113.

Examples of the move operation in the present exemplary embodiment include a position movement by a centering operation. As another exemplary embodiment, an eight-way operation member can be used to move the position.

In step S1112, the system control unit 50 updates the tracking start position based on the move operation to move the tracking start position.

In step S1113, the system control unit 50 determines whether a tracking start operation is performed. If a tracking start operation is performed (YES in step S1113), the processing proceeds to step S1114. If not (NO in step S1113), the processing proceeds to step S1115. Examples of the tracking start operation in the present exemplary embodiment include the customized button function "start tracking".

In step S1114, the system control unit 50 detects an object at the tracking start position, and locks a main object. When locking the main object, the system control unit 50 hides the tracking start position (AF area frame) and displays the tracking frame (e.g., from state 9-*f* to state 9-*g*).

In step S1115, the system control unit 50 determines whether a tracking stop operation is performed. If a tracking stop operation is performed (YES in step S1115), the processing proceeds to step S1116. If not (NO in step S1115), the processing proceeds to step S1117.

In step S1116, the system control unit 50 unlocks the main object. When unlocking the main object, the system control unit 50 also turns off the internal tracking state (e.g., from state 9-*g* to state 9-*f*).

In step S1117, the system control unit 50 determines whether to perform an AF operation. If the system control unit 50 determines to perform an AF operation (YES in step S1117), the processing proceeds to step S1118. If not (NO in step S1117), the processing proceeds to step S1119.

In step S1118, the system control unit 50 performs an AF operation. Examples of the AF operation in the present exemplary embodiment include a one-shot operation. In the case of the one-shot operation, the system control unit 50 performs the one-shot operation once in the imaging preparation state, and locks the focus position after focusing (e.g., from state 9-*a* to state 9-*f*)

In step S1119, the system control unit 50 determines whether an imaging operation is performed. If an imaging operation is performed (YES in step S1119), the processing proceeds to step S1120. If not (NO in step S1119), the processing proceeds to step S1122.

In step S1120, the system control unit 50 captures an image. In the present exemplary embodiment, the system control unit 50 captures an image based on the second shutter switch signal SW2 (e.g., from state 9-*f* to state 9-*k*).

In step S1121, the system control unit 50 determines whether the imaging operation is continued. If the imaging operation is continued (YES in step S1121), the processing returns to step S1120. If the imaging operation is not continued (NO in step S1121), the processing proceeds to step S1122. In the case of one-shot AF, if the drive mode is set to continuous shooting, the system control unit 50 repeats capturing images with the focus position locked while the second shutter switch signal SW2 is held on.

In step S1122, the system control unit 50 determines whether the imaging preparation state is cancelled. If the imaging preparation state is cancelled (YES in step S1122), the processing proceeds to step S1123. If the imaging preparation state is not cancelled (NO in step S1122), the processing returns to step S1111.

In step S1123, the system control unit 50 determines whether to end this procedure. If the system control unit 50 determines to end the procedure (YES in step S1123), the processing proceeds to step S1124. If not (NO in step S1123), the processing returns to step S1102.

In step S1124, the system control unit 50 stores the tracking start position into the storage area (nonvolatile memory 56). The processing ends.

As described above, while the imaging preparation state is continued with tracking off, priority is given to the continuity of tracking and the tracking start position is not reset to its original position but stopped near the tracking object (at the tracking position immediately before). By contrast, in the imaging standby state, the tracking start position is reset to its original position. An optimum tracking start position can thus be set. This provides comfortable operability. Such means are particularly effective in the digital camera 100 determining the imaging object, and enables comfortable imaging without missing a photo opportunity.

In the present exemplary embodiment, rectangular frames are displayed as indices indicating positions and sizes onscreen. However, the frames do not necessarily need to be rectangular. For example, frames having circular, hexagonal, and other shapes can be displayed. A cross sight-like display indicating only position can also be used.

The system control unit 50 can generate metadata based on imaging conditions combining the imaging settings and the detection settings, attach the metadata to image data captured by the imaging unit 22, and record the resulting image data on the recording medium 200. In displaying a recorded image, the metadata recorded in association with the image data can be displayed. The image data and the metadata can be recorded according to a standard such as Exchangeable image file format (Exif).

While the tracking has been described to be stopped only by the user's "stop tracking" operation, the tracking can be automatically stopped in a case where the tracking object is lost, the tracking reliability falls below a predetermined value, or the tracking object is switched.

The foregoing various controls described to be performed by the system control unit 50 can be performed by a piece of hardware. Alternatively, a plurality of pieces of hardware can control the entire apparatus by sharing the processing.

While the exemplary embodiment of the present disclosure has been described in detail above, the present disclosure is not limited to this specific exemplary embodiment, and various modes not departing from the gist of the present disclosure are also included in the present disclosure. The foregoing exemplary embodiment demonstrates just one exemplary embodiment of the present disclosure, and various exemplary embodiments can be combined as appropriate.

The foregoing exemplary embodiment has been described to be applied to the digital camera 100. However, such an example is not restrictive, and an exemplary embodiment of the present disclosure can be applied to any display control apparatus that can control image processing. Specifically, an exemplary embodiment of the present disclosure can be applied to a mobile phone terminal, a portable image viewer, a personal computer (PC), a printer apparatus including a viewfinder, home appliances having a display unit, a digital photo frame, a projector, a tablet PC, a music player, a game machine, and an electronic book reader.

According to the foregoing exemplary embodiment, an optimum tracking start position can be set.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-039130, filed Mar. 14, 2022, which is hereby incorporated by reference herein in its entirety.

What is claimed is:
1. An electronic apparatus comprising:
an operation member to which a predetermined function is able to be assigned by a user, and
at least one processor configured to:
track a tracking object in an image; and
control a tracking start position,
wherein tracking is performed while the operation member is being operated by a user, and
wherein, in a case where tracking a first tracking object is stopped after the tracking the first tracking object, the tracking start position is set to either a first position based on a position where the tracking the first tracking object was stopped, or a second position corresponding to a predetermined position, depending on a state at a time of stopping the tracking of the first tracking object.
2. The electronic apparatus according to claim 1, wherein the tracking object is at least any one of a human figure, an animal, and a vehicle.
3. The electronic apparatus according to claim 1, wherein the tracking is started while automatic focus (AF) processing is performed.
4. The electronic apparatus according to claim 3, wherein the AF processing is started in a state where an imaging preparation instruction is given.
5. The electronic apparatus according to claim 4, wherein the state where the imaging preparation instruction is given is a state where a shutter button is half-pressed.

6. The electronic apparatus according to claim 4, wherein the processor is configured to, in a state where the imaging preparation instruction is held on, perform continuous AF on the tracking object.

7. The electronic apparatus according to claim 1, wherein the image is a live-view image captured by an image sensor.

8. The electronic apparatus according to claim 7, further comprising the image sensor.

9. The electronic apparatus according to claim 1, wherein the processor is configured to set whether to perform the second processing based on the user operation, and to, if a setting to not perform the second processing is made, perform the first processing regardless of the state when the tracking is stopped.

10. A method for controlling an electronic apparatus, comprising:

tracking a tracking object in an image;

controlling a tracking start position, wherein the tracking is performed while an operation member, to which a predetermined function is able to be assigned by a user, is being operated by the user, and wherein, in a case where tracking a first tracking object is stopped after the tracking the first tracking object, the tracking start position is set to either a first position based on a position where the tracking the first tracking object was stopped, or a second position corresponding to a predetermined position, depending on a state at a time of stopping the tracking of the first tracking object.

11. A non-transitory computer-readable storage medium storing a program for causing a computer to perform a method for controlling an electronic apparatus, the method comprising:

tracking a tracking object in an image;

controlling a tracking start position, wherein the tracking is performed while an operation member, to which a predetermined function is able to be assigned by a user, is being operated by the user, and wherein, in a case where tracking a first tracking object is stopped after the tracking the first tracking object, the tracking start position is set to either a first position based on a position where the tracking the first tracking object was stopped, or a second position corresponding to a predetermined position depending on a state at a time of stopping the tracking of the first tracking object.

12. An electronic apparatus comprising:

an operation member to which a predetermined function is able to be assigned by a user, and at least one processor configured to:

track a tracking object in an image; and control a tracking start position, where tracking is stopped while the operation member is being operated by a user, and wherein, in a case where tracking a first tracking object is stopped after the tracking the first tracking object, the tracking start position is set to either a first position based on a position where the tracking the first tracking object was stopped, or a second position corresponding to a predetermined position, depending on a state at a time of stopping the tracking of the first tracking object.

13. The electronic apparatus according to claim 12, wherein the tracking object is at least any one of a human figure, an animal, and a vehicle.

14. The electronic apparatus according to claim 12, wherein the image is a live-view image captured by an image sensor.

15. The electronic apparatus according to claim 14, further comprising the image sensor.

16. The electronic apparatus according to claim 12, wherein the processor is configured to set whether to perform the second processing based on the user operation, and to, if a setting to not perform the second processing is made, perform the first processing regardless of the state when the tracking is stopped.

17. A method for controlling an electronic apparatus, comprising:

tracking a tracking object in an image;

controlling a tracking start position, wherein the tracking is stopped while an operation member, to which a predetermined function is able to be assigned by a user, is being operated by the user, and wherein, in a case where tracking a first tracking object is stopped after the tracking the first tracking object, the tracking start position is set to either a first position based on a position where the tracking the first tracking object was stopped, or a second position corresponding to a predetermined position, depending on a state at a time of stopping the tracking of the first tracking object.

18. A non-transitory computer-readable storage medium storing a program for causing a computer to perform a method for controlling an electronic apparatus, the method comprising:

tracking a tracking object in an image;

controlling a tracking start position, wherein the tracking is stopped while an operation member, to which a predetermined function is able to be assigned by a user, is being operated by the user, and wherein, in a case where tracking a first tracking object is stopped after the tracking the first tracking object, the tracking start position is set to either a first position based on a position where the tracking the first tracking object was stopped, or a second position corresponding to a predetermined position, depending on a state at a time of stopping the tracking of the first tracking object.

* * * * *